(12) United States Patent (10) Patent No.: US 12,603,819 B2
Wang (45) Date of Patent: Apr. 14, 2026

(54) DATA ANALYSIS METHOD AND APPARATUS, ELECTRONIC DEVICE, AND STORAGE MEDIUM

(71) Applicant: DATANG MOBILE COMMUNICATIONS EQUIPMENT CO., LTD., Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/264,922

(22) PCT Filed: Feb. 10, 2022

(86) PCT No.: PCT/CN2022/075751
§ 371 (c)(1),
(2) Date: Aug. 9, 2023

(87) PCT Pub. No.: WO2022/171154
PCT Pub. Date: Aug. 18, 2022

(65) Prior Publication Data
US 2024/0129199 A1 Apr. 18, 2024

(30) Foreign Application Priority Data

Feb. 10, 2021 (CN) .......................... 202110185382.X

(51) Int. Cl.
*H04L 41/14* (2022.01)
*H04W 28/02* (2009.01)
(52) U.S. Cl.
CPC ......... *H04L 41/14* (2013.01); *H04W 28/0226* (2013.01)
(58) Field of Classification Search
CPC ........................... H04L 41/14; H04W 28/0226
(Continued)

(56) References Cited

U.S. PATENT DOCUMENTS 11,310,731 B1* 4/2022 Feder .................... H04W 36/32
2018/0359650 A1* 12/2018 Chandrashekar ..... H04W 24/08
(Continued)

FOREIGN PATENT DOCUMENTS

CN 110312279 A 10/2019
CN 110798360 A 2/2020
(Continued)

OTHER PUBLICATIONS

Huawei et al., "Miscellaneous corrections for TR 23.700-91", 3GPP TSG SA2 Meeting #141E e-meeting, Elbonia, Oct. 12-Oct. 23, 2020, total 26 pages, S2-2006908.
(Continued)

*Primary Examiner* — Wing F Chan
*Assistant Examiner* — John Fan
(74) *Attorney, Agent, or Firm* — KILPATRICK TOWNSEND & STOCKTON LLP

(57) ABSTRACT

Provided in the embodiments of the present disclosure are a data analysis method and apparatus, an electronic device, and a storage medium, the method including receiving a first analysis request message sent by a consumer network element, the first analysis request message containing an analysis identifier; and, on the basis of the first analysis request message, determining that a first NWDAF network element or another NWDAF network element provides the consumer network element with a data analysis result corresponding to the analysis identifier. When an NWDAF network element has not received area of interest information provided by the consumer network element, then determining on the basis of the analysis identifier included in the analysis request message that the first NWDAF network element or another NWDAF network element provides the data analysis result corresponding to the analysis identifier.

19 Claims, 7 Drawing Sheets

(58) Field of Classification Search
USPC ........................................................ 709/206
See application file for complete search history.

(56) References Cited

U.S. PATENT DOCUMENTS

| | | | | |
|---|---|---|---|---|
| 2019/0394655 A1 * | 12/2019 | Rahman | ................ | H04L 41/142 |
| 2020/0358670 A1 | 11/2020 | Lee et al. | | |
| 2021/0076320 A1 * | 3/2021 | Park | ...................... | H04L 69/322 |
| 2021/0144076 A1 * | 5/2021 | Lee | ........................ | G06F 18/214 |
| 2022/0053348 A1 * | 2/2022 | Singh | .................. | H04L 67/1001 |
| 2022/0060388 A1 * | 2/2022 | Li | ........................ | H04L 41/0866 |

FOREIGN PATENT DOCUMENTS

| | | | |
|---|---|---|---|
| CN | 111586601 A | 8/2020 | |
| CN | 111901367 A | 11/2020 | |
| GB | 202004073 | 5/2020 | |
| KR | 20200116844 A | 10/2020 | |
| WO | 2019047913 A1 | 3/2019 | |
| WO | 2020207178 A1 | 10/2020 | |
| WO | WO-2020224492 A1 * | 11/2020 | ............. H04L 47/83 |

OTHER PUBLICATIONS

European Patent Office, Extended European Search Report Issued in Application No. 22752314.9, Jul. 2, 2024, Germany, 13 pages.
3GPP TR 23.700-91 V17.0.0, 3rd Generation Partnership Project; Technical Specification Group Services and System Aspects; Study on enablers for network automation for the 5G System (5GS); Phase 2 (Release 17), Dec. 2020.
The first office action and search report issued in Chinese corresponding application 202110185382.X, mailed on Dec. 31, 2024.
Office Action of Corresponding CN Patent Application No. 202110185382.X Dated May 29, 2025.

* cited by examiner transmitting a first analytics request message to a first NWDAF network function, where the first analytics request message includes an analytics ID ⟋ 601

Receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving AOI information ⟋ 602

FIG. 6

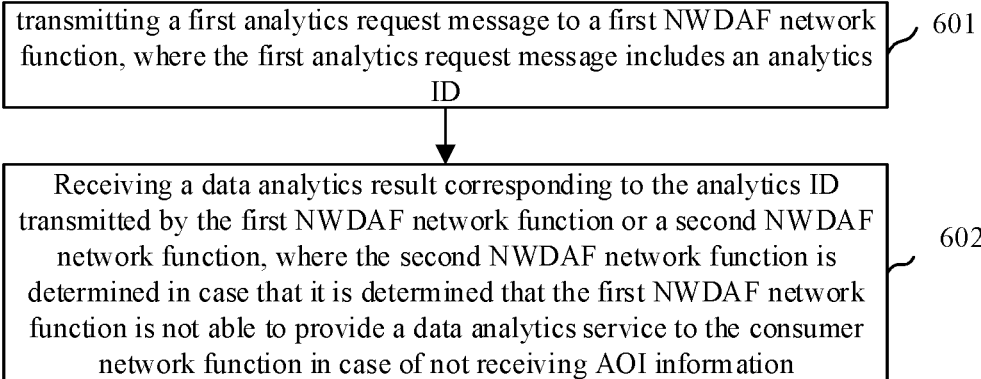

Receive analytics request/subscription

Determine whether it is needed to obtain a UE location based on an analytics ID?

No                                                                 Yes

Determine a NF providing metadata for data analytics

Determine an AMF serving the UE, and subscribe the UE location from the AMF

Query the serving area of the NF from a NRF

Is the serving area of the NF within the serving area of the NWDAF?

Is the UE within the serving area of the NWDAF?

Yes ⟶ Perform data analytics ⟵ Yes

No ⟶ Perform NWDAF discovery ⟵ No

DATA ANALYSIS METHOD AND APPARATUS, ELECTRONIC DEVICE, AND STORAGE MEDIUM

CROSS-REFERENCE TO RELATED APPLICATION

The present application is a National Stage of International Application No. PCT/CN2022/075751, filed on Feb. 10, 2022, which claims priority to Chinese Patent Application No. 202110185382.X, filed on Feb. 10, 2021, entitled "Data Analysis Method and Apparatus, Electronic Device, and Storage Medium", which are hereby incorporated by reference in their entireties.

FIELD

The present application relates to the field of communication, and in particular to methods and apparatuses for data analytics, electronic devices and a storage medium.

BACKGROUND

In the 3rd generation partnership project (3GPP), a network data analytics function (NWDAF) network function is introduced. The NWDAF network function can provide network data analytics service.

In case that a consumer network function requests data analytics, an NWDAF network function is obtained through a network repository function (NRF) network function, and the network data analytics service is provided for the consumer network function through the obtained NWDAF network function.

Since a list of NWDAF network functions responded by the NRF network function includes multiple NWDAF network functions capable of providing data analytics service, the consumer network function may need to interact with different NWDAF network functions for multiple times to obtain a correct data analytics result, which may cause a waste of system resource.

SUMMARY

Embodiments of the present application provide methods and apparatuses for data analytics, electronic devices and a storage medium, which avoid a waste of system resource during a process of obtaining a data analytics result by a consumer network function.

An embodiment of the present application provides a method for data analytics, applied to a first network data analytics function (NWDAF) network function, including:

receiving a first analytics request message transmitted by a consumer network function, where the first analytics request message includes an analytics identifier (ID); and determining, based on the first analytics request message, that the first NWDAF network function or other NWDAF network function provides the consumer network function with a data analytics result corresponding to the analytics ID.

In an embodiment, the determining, based on the first analytics request message, that the first NWDAF network function or other NWDAF network function provides the consumer network function with the data analytics result corresponding to the analytics ID includes:

in case that the first analytics request message does not include area of interest (AOI) information, determining whether the first NWDAF network function is able to provide a data analytics service to the consumer network function based on the analytics ID, if the first NWDAF network function is able to provide the data analytics service to the consumer network function, determining that the first NWDAF network function provides the consumer network function with the data analytics result corresponding to the analytics ID; or if the first NWDAF network function is not able to provide the data analytics service to the consumer network function, determining that other NWDAF network function provides the consumer network function with the data analytics result corresponding to the analytics ID.

In an embodiment, the determining, based on the analytics ID, whether the first NWDAF network function is able to provide the data analytics service to the consumer network function includes:

obtaining the UE location in case that a user equipment (UE) location is required for data analytics corresponding to the analytics ID;

if the UE location is within a serving area of the first NWDAF network function, determining that the first NWDAF network function is able to provide the data analytics service to the consumer network function; and if the UE location is not within the serving area of the first NWDAF network function, determining that the first NWDAF network function is not able to provide the data analytics service to the consumer network function.

In an embodiment, the determining, based on the first analytics request message, that other NWDAF network function provides the consumer network function with the data analytics result corresponding to the analytics ID includes:

in case that it is determined, based on the first analytics request message, that the first NWDAF network function is not able to provide the data analytics service to the consumer network function, determining the other NWDAF network function, where the other NWDAF network function is used for providing the consumer network function with the data analytics result corresponding to the analytics ID.

In an embodiment, the determining that the first NWDAF network function is not able to provide the data analytics service to the consumer network function includes:

obtaining a UE location based on data analytics corresponding to the analytics ID; and if the UE location is not within a serving area of the first NWDAF network function, determining that the first NWDAF network function is not able to provide the data analytics service to the consumer network function.

In an embodiment, the obtaining the UE location includes:

obtaining the UE location from an access and mobility management function (AMF) network function serving the UE.

In an embodiment, the determining, based on the analytics ID, whether the first NWDAF network function is able to provide the data analytics service to the consumer network function includes:

determining a network function (NF) providing metadata based on the analytics ID;

obtaining a serving area of the NF;

if the serving area of the NF is within a serving area of the first NWDAF network function, determining that the first NWDAF network function is able to provide the data analytics service to the consumer network function; and if the serving area of the NF is not within the serving area of the first NWDAF network function, determining that the first NWDAF network function is not able to provide the data analytics service to the consumer network function.

In an embodiment, determining the serving area of the NF providing metadata includes:

determining a network function ID of the NF providing metadata based on the analytics ID; and querying, based on the network function ID of the NF, the serving area of the NF corresponding to the network function ID of the NF from a network repository function (NRF) network function; or querying the serving area of the NF from the NF corresponding to the network function ID of the NF.

In an embodiment, after the determining that other NWDAF network function provides the consumer network function with the data analytics result corresponding to the analytics ID, the method further includes:

transmitting an Nnrf_NFDiscovery_Request message to the NRF network function, where the Nnrf_NFDiscovery_Request message includes the UE location or serving area information of the NF providing metadata; and receiving a candidate NWDAF network function list transmitted by the NRF network function, where the candidate NWDAF network function list is determined by the NRF network function based on the UE location or the serving area information of the NF providing metadata, and the candidate NWDAF network function list includes a second NWDAF network function being able to provide the consumer network function with the data analytics result corresponding to the analytics ID.

In an embodiment, the method further includes:

transmitting the candidate NWDAF network function list to the consumer network function, or transmitting the second NWDAF network function determined based on the candidate NWDAF network function list to the consumer network function.

In an embodiment, the method further includes:

selecting a candidate NWDAF network function, from the candidate NWDAF network function list, as the second NWDAF network function; and transmitting a second analytics request message to the second NWDAF network function, where the second analytics request message includes an ID of the consumer network function and the analytics ID.

An embodiment of the present application provides a method for data analytics, applied to a second network data analytics function (NWDAF) network function, including:

receiving an analytics request message, where the analytics request message includes an analytics identifier (ID), and the analytics request message is transmitted by a first NWDAF network function or a consumer network function in case that the first NWDAF network function is not able to provide a data analytics service to the consumer network function in case of not receiving area of interest (AOI) information; and providing, based on the analytics request message, a data analytics result corresponding to the analytics ID to the consumer network function.

In an embodiment, in case that the analytics request message is transmitted by the first NWDAF network function, the analytics request message includes an ID of the consumer network function, the method further includes:

transmitting an analytics response message to the consumer network function corresponding to the ID of the consumer network function, where the analytics response message is used to characterize that a second NWDAF network function provides the data analytics service to the consumer network function; and the providing, based on the analytics request message, the data analytics result corresponding to the analytics ID to the consumer network function includes:

performing data analytics based on the analytics ID included in the analytics request message and providing the consumer network function corresponding to the ID of the consumer network function with the data analytics result.

In an embodiment, the analytics request message further includes a UE location or serving area information of an NF providing metadata, the providing, based on the analytics request message, the data analytics result corresponding to the analytics ID to the consumer network function includes:

performing data analytics based on the UE location or the serving area information of the NF providing metadata included in the analytics request message and providing the data analytics result corresponding to the analytics ID to the consumer network function.

An embodiment of the present application provides a method for data analytics, applied to a consumer network function, including:

transmitting a first analytics request message to a first network data analytics function (NWDAF) network function, where the first analytics request message includes an analytics identifier (ID); and receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

In an embodiment, the receiving the data analytics result corresponding to the analytics ID transmitted by the second NWDAF network function includes:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

In an embodiment, the receiving the data analytics result corresponding to the analytics ID transmitted by the second NWDAF network function includes:

receiving a candidate NWDAF network function list transmitted by the first NWDAF network function, where the candidate NWDAF network function list includes ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, where the third analytics request message includes the analytics ID; and receiving the data analytics result corresponding to the analytics ID transmitted by the second NWDAF network function.

An embodiment of the present application provides a first network data analytics function (NWDAF) network function, including: a memory, a transceiver and a processor, where the memory is used for storing computer programs; the transceiver is used for transmitting and receiving data under a control of the processor; and the processor is used for reading the computer program in the memory and executing the following operations:

receiving a first analytics request message transmitted by a consumer network function, where the first analytics request message includes an analytics identifier (ID); and determining, based on the first analytics request message, that the first NWDAF network function or other NWDAF network function provides the consumer network function with a data analytics result corresponding to the analytics ID.

In an embodiment, the determining, based on the first analytics request message, that the first NWDAF network function or other NWDAF network function provides the consumer network function with the data analytics result corresponding to the analytics ID includes:

in case that the first analytics request message does not include area of interest (AOI) information, determining whether the first NWDAF network function is able to provide a data analytics service to the consumer network function based on the analytics ID, if the first NWDAF network function is able to provide the data analytics service to the consumer network function, determining that the first NWDAF network function provides the consumer network function with the data analytics result corresponding to the analytics ID; or if the first NWDAF network function is not able to provide the data analytics service to the consumer network function, determining that other NWDAF network function provides the consumer network function with the data analytics result corresponding to the analytics ID.

In an embodiment, the determining, based on the analytics ID, whether the first NWDAF network function is able to provide the data analytics service to the consumer network function includes:

obtaining the UE location in case that a user equipment (UE) location is required for data analytics corresponding to the analytics ID;

if the UE location is within a serving area of the first NWDAF network function, determining that the first NWDAF network function is able to provide the data analytics service to the consumer network function; and if the UE location is not within the serving area of the first NWDAF network function, determining that the first NWDAF network function is not able to provide the data analytics service to the consumer network function.

In an embodiment, the determining, based on the first analytics request message, that other NWDAF network function provides the consumer network function with the data analytics result corresponding to the analytics ID includes:

in case that it is determined, based on the first analytics request message, that the first NWDAF network function is not able to provide the data analytics service to the consumer network function, determining the other NWDAF network function, where the other NWDAF network function is used for providing the consumer network function with the data analytics result corresponding to the analytics ID.

In an embodiment, determining that the first NWDAF network function is not able to provide the data analytics service to the consumer network function includes:

obtaining a UE location based on data analytics corresponding to the analytics ID; and if the UE location is not within a serving area of the first NWDAF network function, determining that the first NWDAF network function is not able to provide the data analytics service to the consumer network function.

In an embodiment, the obtaining the UE location includes:

obtaining the UE location from an access and mobility management function (AMF) network function serving the UE.

In an embodiment, the determining, based on the analytics ID, whether the first NWDAF network function is able to provide the data analytics service to the consumer network function includes:

determining a network function (NF) providing metadata based on the analytics ID;

obtaining a serving area of the NF;

if the serving area of the NF is within a serving area of the first NWDAF network function, determining that the first NWDAF network function is able to provide the data analytics service to the consumer network function; and if the serving area of the NF is not within the serving area of the first NWDAF network function, determining that the first NWDAF network function is not able to provide the data analytics service to the consumer network function.

In an embodiment, determining the serving area of the NF providing metadata includes:

determining a network function ID of the NF providing metadata based on the analytics ID; and querying, based on the network function ID of the NF, the serving area of the NF corresponding to the network function ID of the NF from a network repository function (NRF) network function; or querying the serving area of the NF from the NF corresponding to the network function ID of the NF.

In an embodiment, after determining that other NWDAF network function provides the consumer network function with the data analytics result corresponding to the analytics ID, the processor is further used for:

transmitting an Nnrf_NFDiscovery_Request message to the NRF network function, where the Nnrf_NFDiscovery_Request message includes the UE location or serving area information of the NF providing metadata; and receiving a candidate NWDAF network function list transmitted by the NRF network function, where the candidate NWDAF network function list is determined by the NRF network function based on the UE location or the serving area information of the NF providing metadata, and the candidate NWDAF network function list includes a second NWDAF network function being able to provide the consumer network function with the data analytics result corresponding to the analytics ID.

In an embodiment, the processor is further used for:

transmitting the candidate NWDAF network function list to the consumer network function, or transmitting the second NWDAF network function determined based on the candidate NWDAF network function list to the consumer network function.

In an embodiment, the processor is further used for:

selecting a candidate NWDAF network function, from the candidate NWDAF network function list, as the second NWDAF network function; and transmitting a second analytics request message to the second NWDAF network function, where the second analytics request message includes an ID of the consumer network function and the analytics ID.

An embodiment of the present application provides a second NWDAF network function, including: a memory, a transceiver and a processor, where the memory is used for storing computer programs; the transceiver is used for transmitting and receiving data under a control of the processor; and the processor is used for reading the computer program in the memory and executing the following operations:

receiving an analytics request message, where the analytics request message includes an analytics identifier (ID), and the analytics request message is transmitted by a first NWDAF network function or a consumer network function in case that the first NWDAF network function is not able to provide a data analytics service to the consumer network function in case of not receiving area of interest (AOI) information; and providing, based on the analytics request message, a data analytics result corresponding to the analytics ID to the consumer network function.

In an embodiment, in case that the analytics request message is transmitted by the first NWDAF network function, the analytics request message includes an ID of the consumer network function, the processor is further used for:

transmitting an analytics response message to the consumer network function corresponding to the ID of the consumer network function, where the analytics response message is used to characterize that a second NWDAF network function provides the data analytics service to the consumer network function; and the providing, based on the analytics request message, the data analytics result corresponding to the analytics ID to the consumer network function includes:

performing data analytics based on the analytics ID included in the analytics request message and providing the consumer network function corresponding to the ID of the consumer network function with the data analytics result.

In an embodiment, the analytics request message further includes a UE location or serving area information of an NF providing metadata, the providing, based on the analytics request message, the data analytics result corresponding to the analytics ID to the consumer network function includes:

performing data analytics based on the UE location or the serving area information of the NF providing metadata included in the analytics request message and providing the data analytics result corresponding to the analytics ID to the consumer network function.

An embodiment of the present application provides a consumer network function, including: a memory, a transceiver and a processor, where the memory is used for storing computer programs; the transceiver is used for transmitting and receiving data under a control of the processor; and the processor is used for reading the computer program in the memory and executing the following operations:

transmitting a first analytics request message to a first network data analytics function (NWDAF) network function, where the first analytics request message includes an analytics identifier (ID); and receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

In an embodiment, the receiving the data analytics result corresponding to the analytics ID transmitted by the second NWDAF network function includes:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

In an embodiment, the receiving the data analytics result corresponding to the analytics ID transmitted by the second NWDAF network function includes:

receiving a candidate NWDAF network function list transmitted by the first NWDAF network function, where the candidate NWDAF network function list includes ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, where the third analytics request message includes the analytics ID; and receiving the data analytics result corresponding to the analytics ID transmitted by the second NWDAF network function.

An embodiment of the present application provides an apparatus for data analytics, including:

a first receiving device, used for receiving a first analytics request message transmitted by a consumer network function, where the first analytics request message includes an analytics identifier (ID); and a determining device, used for determining, based on the first analytics request message, that the first NWDAF network function or other NWDAF network function provides the consumer network function with a data analytics result corresponding to the analytics ID.

An embodiment of the present application provides an apparatus for data analytics, including:

a second receiving device, used for receiving an analytics request message, where the analytics request message includes an analytics identifier (ID), and the analytics request message is transmitted by a first NWDAF network function or a consumer network function in case that the first NWDAF network function is not able to provide a data analytics service to the consumer network function in case of not receiving area of interest (AOI) information; and a first transmitting device, used for providing, based on the analytics request message, a data analytics result corresponding to the analytics ID to the consumer network function.

An embodiment of the present application provides an apparatus for data analytics, applied to the consumer network function, including:

a second transmitting device, used for transmitting a first analytics request message to a first network data analytics function (NWDAF) network function, where the first analytics request message includes an analytics identifier (ID); and a third receiving device, used for receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

An embodiment of the present application provides a system for data analytics, including a consumer network function, a first network data analytics function (NWDAF) network function and a second NWDAF network function, and the consumer network function is used for transmitting a first analytics request message to the first network data analytics function (NWDAF) network function, where the first analytics request message includes an analytics identifier (ID);

the first NWDAF network function is used for determining, based on the first analytics request message, that the first NWDAF network function or other NWDAF network function provides the consumer network function with a data analytics result corresponding to the analytics ID; and the second NWDAF network function is used for providing the data analytics result corresponding to the analytics ID to the consumer network function in case that it is determined by the first NWDAF network function that the other NWDAF network function provides the consumer network function with the data analytics result corresponding to the analytics ID.

An embodiment of the present application provides a non-transitory processor readable storage medium, which stores a computer program. And the computer program is used for causing the processor to perform the method for data analytics.

In the methods and apparatuses for data analytics, electronic devices, and storage medium provided by the embodiments of the present application, in the case that the NWDAF network function receives the analytics request message, the NWDAF network function determines, based on the analytics ID included in the analytics request message, that the first NWDAF network function or other NWDAF network function provides the data analytics result corresponding to the analytics ID. As such, the NWDAF network function that is able to provide accurate data analytics result for the consumer network function is determined, which avoids the frequent interaction between the NWDAF network function and the consumer network function, ensures that the consumer network function may obtain the accurate data analytics result, saves the system resource, and improves utilization rate of system.

BRIEF DESCRIPTION OF DRAWINGS

In order to clearly illustrate the solutions of the embodiments according to the present application or the related art, the accompanying drawings used in the description of the embodiments or the related art are briefly introduced below. It should be noted that the drawings in the following description are only some embodiments of the present application.

FIG. 6 is a third schematic flow diagram of a method for data analytics according to an embodiment of the present application;

FIG. 7 is a first logical flow diagram of data analytics according to an embodiment of the present application;

DETAILED DESCRIPTION OF THE EMBODIMENTS

Multiple network data analytics functions (NWDAF) have been introduced in the 3GPP network to provide network data analytics service. In case that a consumer network function requests data analytics, a network repository function (NRF) needs to query a suitable NWDAF to provide a data analytics service. However, in case that the consumer network function does not provide enough filtering information (such as area of interest (AOI) information) to assist the NRF in selecting the suitable NWDAF, for example, the consumer network function requests mobility analytics for a terminal or a user equipment (UE), the NRF may respond a list of all NWDAFs that is able to provide analytics, which may cause the consumer network function to transmit an analytics request message to a wrong NWDAF network function (such as an NWDAF network function that does not serve the UE location), and thus a correct data analytics result may not be obtained. In this way, the consumer network function needs to interact with different NWDAF network functions many times to obtain the correct data analytics result, which causes a waste of system resource.

Figures 1, 2:
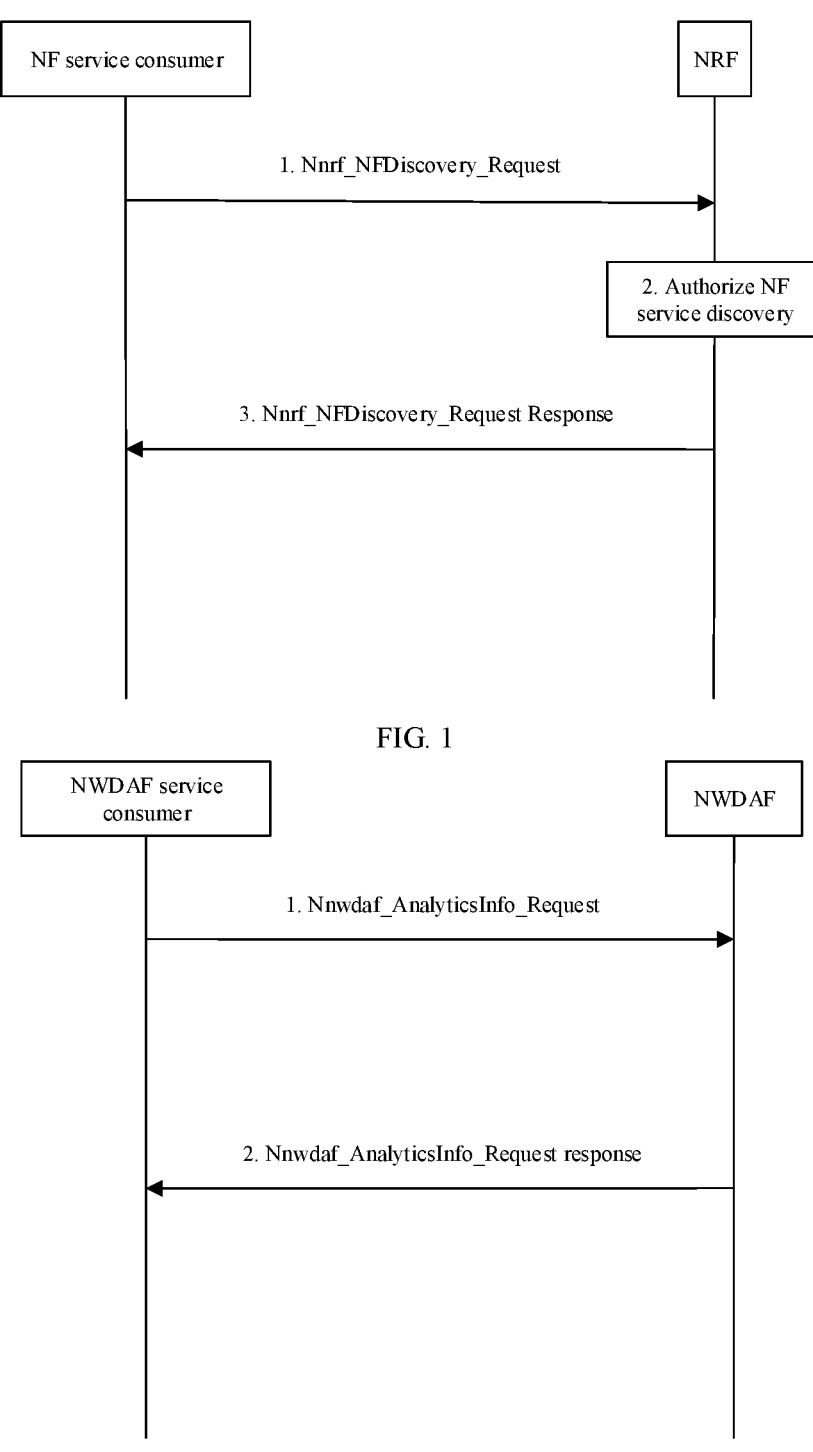
FIG. 1 is a schematic diagram of signaling interaction for an NWDAF discovery.
FIG. 2 is a first schematic diagram of signaling interaction for requesting an NWDAF to provide analytics result.

FIG. 1 is a schematic diagram of signaling interaction for an NWDAF discovery. As shown in FIG. 1, the signaling interaction for the NWDAF discovery includes the following steps.

1. Discovering, by a network function (NF) service consumer, services available in a network based on a service name and a target NF type. The NF service consumer invokes an NF discovery request (Nnrf_NFDiscovery_Request) from an appropriate configured NRF. The Nnrf_NF-Discovery_Request includes an expected NF service name, an NF type of an expected NF instance and an NF type of the NF consumer.

2. Authorizing the Nnrf_NFDiscovery_Request by the NRF. Based on the profile of the expected NF/NF service and the type of the NF service consumer, the NRF determines whether the NF service consumer is allowed to discover the expected NF instance.

3. Determining, in case that the NF service consumer is allowed to discover the expected NF instance, by the NRF, an NF instance or an NF service instance that may be discovered and providing information of a set of discovered NF instances or NF service instances to the NF service consumer through an NF discovery request response (Nnrf_NFDiscovery_RequestResponse).

In a related scheme, the consumer network function may have two modes to request NWDAF to provide an analytics result, which include a request-response mode and a subscription-notification mode.

FIG. 2 is a first schematic diagram of signaling interaction for requesting an NWDAF to provide analytics result. As shown in FIG. 2, in the request-response mode, the signaling interaction for requesting the NWDAF to provide analytics result includes the following steps.

1. Requesting, by an NWDAF service consumer, analytics information by invoking an analytics information request (Nnwdaf_AnalyticsInfo_Request) service operation. The NWDAF determines whether a new data collection is needed.

2. Responding, by the NWDAF, to the NWDAF service consumer with a response consisted of the analytics information (Nnwdaf_AnalyticsInfo_Request response).

Figure 3:
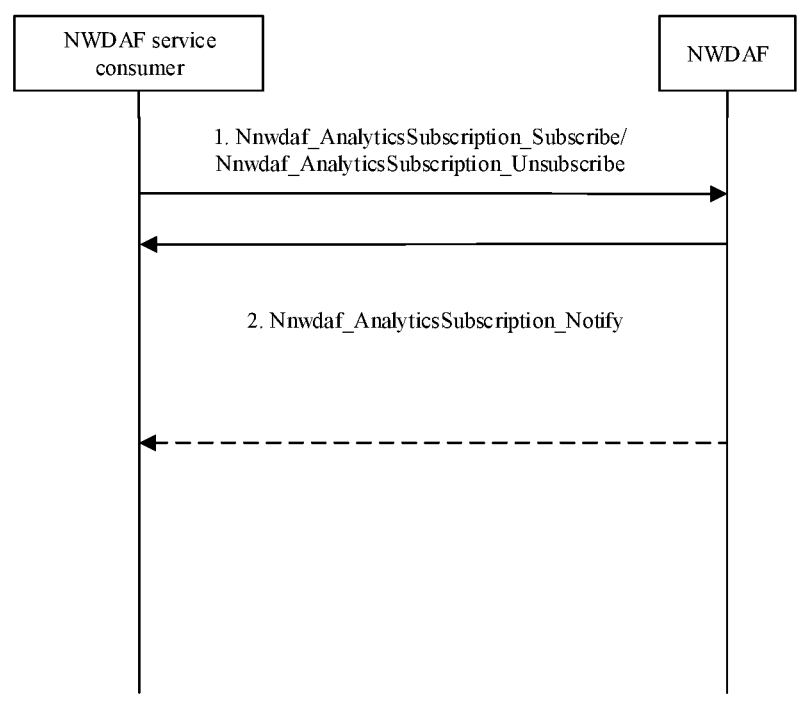
FIG. 3 is a second schematic diagram of signaling interaction for requesting an NWDAF to provide analytics result.

FIG. 3 is a second schematic diagram of signaling interaction for requesting an NWDAF to provide analytics result. As shown in FIG. 3, in the subscription-notification mode, the signaling interaction for analytics request or subscription includes the following steps.

1. Subscribing or unsubscribing, by an NWDAF service consumer, to analytics information by invoking an analytics subscription subscribe (Nnwdaf_AnalyticsSubscription_Subscribe) service operation or an analytics subscription unsubscribe (Nnwdaf_AnalyticsSubscription_Unsubscribe)

service operation. The NWDAF determines whether to trigger a new data collection in case that the subscription to the analytics information is received.

2. Notifying, by the NWDAF, the NWDAF service consumer of analytics information by invoking an analytics subscription notify (Nnwdaf_AnalyticsSubscription_Notify) service operation in case that the NF service consumer subscribes to the analytics information.

In a related scheme, in case that the consumer network function does not provide appropriate filtering information, such as AOI information, the NWDAF which is able to provide the data analytics service may not be determined. In this situation, the consumer network function needs to interact with different NWDAF network functions to obtain the correct data analytics result, which causes the waste of system resource.

The solutions according to the present application are clearly described below in combination with the accompanying drawings in the embodiments of the present application. It should be noted that the described embodiments are some embodiments of the present application, rather than all the embodiments.

Figure 4:
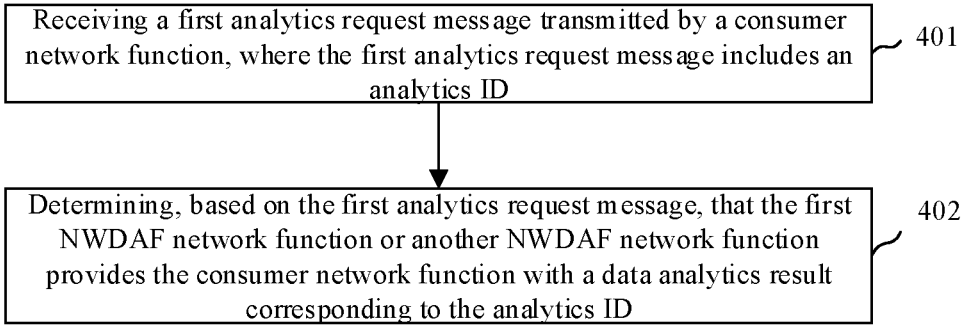
FIG. 4 is a first schematic flow diagram of a method for data analytics according to an embodiment of the present application.

FIG. 4 is a first schematic flow diagram of a method for data analytics according to an embodiment of the present application. As shown in FIG. 4, an embodiment of the present application provides a method for data analytics, an execution entity of the method for data analytics is a first NWDAF network function, and the method includes the following steps.

Step 401: receiving a first analytics request message transmitted by a consumer network function, where the first analytics request message includes an analytics identifier (ID).

The consumer network function transmits the first analytics request message to the first NWDAF network function in case that the consumer network function has a requirement for data analytics.

The first NWDAF network function receives the first analytics request message transmitted by the consumer network function.

The first analytics request message includes an analytics ID.

The analytics ID may indicate an analytics for UE mobility, UE communication, abnormal behavior, service experience or NF load information.

Step 402: determining, based on the first analytics request message, that the first NWDAF network function or other NWDAF network function provides the consumer network function with a data analytics result corresponding to the analytics ID.

After the first NWDAF network function receives the first analytics request message transmitted by the consumer network function, the first NWDAF network function determines, based on the first analytics request message, that the first NWDAF network function itself or other NWDAF network function provides the consumer network function with the data analytics result corresponding to the analytics ID.

If the first NWDAF network function is able to provide the data analytics service to the consumer network function, the first NWDAF network function provides data analytics service to the consumer network function.

If the first NWDAF network function is not able to provide the data analytics service to the consumer network function, other NWDAF network function provides data analytics service to the consumer network function.

After it is determined that the first NWDAF network function or other NWDAF network function provides the consumer network function with the data analytics result corresponding to the analytics ID, the first NWDAF network function or other NWDAF network function provides data analytics service to the consumer network function.

The consumer network function receives the data analytics result corresponding to the analytics ID transmitted by the first NWDAF network function or a second NWDAF network function.

The second NWDAF network function is determined in case that it is determined that the first NWDAF network function is not able to provide the data analytics service to the consumer network function in a situation where the first NWDAF network function does not receive the AOI information.

According to the method for data analytics provided by the present application, in case that the NWDAF network function does not receive the AOI information provided by the consumer network function, it is determined, based on the analytics ID included in the analytics request message, that the first NWDAF network function or other NWDAF network function provides the data analytics result corresponding to the analytics ID, which avoids frequently receiving the analytics request from the consumer network function in a situation where NWDAF network function cannot provide the data analytics result to the consumer network function, and improves a utilization rate of the system resource.

In an embodiment, the determining, based on the first analytics request message, that the first NWDAF network function or other NWDAF network function provides the consumer network function with the data analytics result corresponding to the analytics ID includes:

in case that the first analytics request message does not include area of interest (AOI) information, determining, based on the analytics ID, whether the first NWDAF network function is able to provide the data analytics service to the consumer network function, if the first NWDAF network function is able to provide the data analytics service to the consumer network function, determining that the first NWDAF network function provides the consumer network function with the data analytics result corresponding to the analytics ID; or if the first NWDAF network function is not able to provide the data analytics service to the consumer network function, determining that other NWDAF network function provides the consumer network function with the data analytics result corresponding to the analytics ID.

In an embodiment, the determining, based on the first analytics request message, that the first NWDAF network function or other NWDAF network function provides the consumer network function with the data analytics result corresponding to the analytics ID includes the following steps.

Firstly, determining whether the first analytics request message include the AOI information: if the first analytics request message does not include the AOI information, determining, based on the analytics ID, whether the first NWDAF network function is able to provide the data analytics service to the consumer network function; and if the first analytics request message includes the AOI information, determining, based on the AOI information, by the first NWDAF network function, the NWDAF network function for providing data analytics service to the consumer network function.

Secondly, if the first NWDAF network function is able to provide the data analytics service to the consumer network function, the first NWDAF network function directly provides the consumer network function with the data analytics result corresponding to the analytics ID; or if the first NWDAF network function is not able to provide the data analytics service to the consumer network function, it is determined that other NWDAF network function provides the consumer network function with the data analytics result corresponding to the analytics ID.

According to the method for data analytics provided by the present application, in case that the first analytics request message does not include the AOI information, the NWDAF network function determines, based on the analytics ID included in the first analytics request message, that the first NWDAF network function or other NWDAF network function provides the data analytics result corresponding to the analytics ID, which further improves the utilization rate of the system resource.

In an embodiment, the determining, based on the analytics ID, whether the first NWDAF network function is able to provide the data analytic service to the consumer network function includes:

obtaining the UE location in case that a user equipment (UE) location is required for data analytics corresponding to the data analytics ID;

if the UE location is within a serving area of the first NWDAF network function, determining that the first NWDAF network function is able to provide the data analytics service to the consumer network function; and if the UE location is not within the serving area of the first NWDAF network function, determining that the first NWDAF network function is not able to provide the data analytics service to the consumer network function.

It should be noted that, "the UE location is not within the serving area of the first NWDAF network function" may be expressed as, including by not limited to:

the serving area of the first NWDAF network function is different from the UE location;

the serving area of the first NWDAF network function does not include the UE location; or the first NWDAF network function provides a serving area different from the UE location, etc.

In an embodiment, the determining, based on the analytics ID, by the first NWDAF network function, whether the first NWDAF network function is able to provide the data analytics service to the consumer network function includes the following steps.

Firstly, determining whether the UE location is required for the data analytics corresponding to the analytics ID, and in case that the UE location is required for the data analytics corresponding to the analytics ID, obtaining the UE location.

In case that the analytics ID indicates that analytics for UE mobility and/or an abnormal behavior is required, the UE location needs to be obtained.

In case that the analytics ID indicates that analytics for UE communication, service experience or NF load information is required, the UE location does not need to be obtained.

Secondly, determining whether the UE location is within the serving area of the first NWDAF network function.

If the UE location is within the serving area of the first NWDAF network function, determining that the first NWDAF network function is able to provide the data analytics service to the consumer network function.

If the UE location is not within the serving area of the first NWDAF network function, determining that the first NWDAF network function is not able to provide the data analytics service to the consumer network function.

According to the method for data analytics provided by the present application, by determining whether the UE location is within the serving area of the first NWDAF network function, the utilization rate of the system resource is further improved.

In an embodiment, the determining, based on the first analytics request message, that other NWDAF network function provides the consumer network function with the data analytics result corresponding to the analytics ID, includes:

in case that it is determined, based on the first analytics request message, that the first NWDAF network function is not able to provide the data analytics service to the consumer network function, determining the other NWDAF network function, where the other NWDAF network function is used for providing the consumer network function with the data analytics result corresponding to the analytics ID.

In the present application, the first NWDAF network function determines, based on the first analytics message, that other NWDAF network function provides the consumer network function with the data analytics result corresponding to the analytics ID includes:

the first NWDAF network function determines, based on the first analytics request message, whether the first NWDAF network function itself is able to provide the data analytics service to the consumer network function.

The details of determining whether the first NWDAF network function is able to provide the data analytics service to the consumer network function are demonstrated as the above embodiments, which are not repeated herein.

In an embodiment, is case that the first NWDAF network function determines that the first NWDAF network function is not able to provide the data analytics service to the consumer network function, other NWDAF network function is determined, and the other NWDAF network function provides the consumer network function with the data analytics result corresponding to the analytics ID.

The details of determining other NWDAF network function are described in the following.

In an embodiment, the first NWDAF network function selects a second NWDAF network function from a candidate NWDAF network function list, where the second NWDAF network function is the other NWDAF network function that provides the consumer network function with the data analytics result corresponding to the analytics ID.

In an embodiment, firstly, the first NWDAF network function transmits an Nnrf_NFDiscovery_Request message to the NRF network function.

The Nnrf_NFDiscovery_Request message includes the UE location or serving area information of the NF providing metadata.

The NRF network function receives the Nnrf_NFDiscovery_Request message transmitted by the first NWDAF network function, and based on the UE location or the serving area information of the NF providing metadata included in the Nnrf_NFDiscovery_Request message, the NRF network function determines the candidate NWDAF network function list.

The candidate NWDAF network function list includes multiple NWDAF network functions being able to provide the consumer network function with the data analytics result corresponding to the analytics ID.

The NRF network function transmits the candidate NWDAF network function list to the first NWDAF network function.

Secondly, the first NWDAF network function receives the candidate NWDAF network function list transmitted by the NRF network function.

The first NWDAF network function selects the second NWDAF network function from the candidate NWDAF network function list, where the second NWDAF network function is the other NWDAF network function that provides the consumer network function with the data analytics result corresponding to the analytics ID.

According to the method for data analytics provided by the present application, in case that the first NWDAF network function determines that the first NWDAF network function itself is not able to provide the data analytics service to the consumer network function, it is determined that other NWDAF network function provides the consumer network function with the data analytics result corresponding to the analytics ID, which ensures that the data analytics service is uninterrupted, and further improves the system stability.

In an embodiment, the determining that the first NWDAF network function is not able to provide the data analytics service to the consumer network function includes:

obtaining the UE location based on the data analytics corresponding to the analytics ID; and if the UE location is not within the serving area of the first NWDAF network function, determining that the first NWDAF network function is not able to provide the data analytics service to the consumer network function.

In an embodiment, the determining that the first NWDAF network function is not able to provide the data analytics service to the consumer network function includes the following steps.

Firstly, determining whether the UE location is required for the data analytics corresponding to the analytics ID, and in case that the UE location is required for the data analytics corresponding to the analytics ID, obtaining the UE location.

The details of determining, based on the analytics ID, whether the UE location is required are demonstrated as above embodiments, which are not repeated herein.

Secondly, determining whether the UE location is within the serving area of the first NWDAF network function.

If the UE location is not within the serving area of the first NWDAF network function, determining that the first NWDAF is not able to provide the data analytics service to the consumer network function.

According to the method for data analytics provided by the present application, a premise of providing data analytics service to the consumer network function by other NWDAF network function is that the first NWDAF network function is not able to provide the data analytics service to the consumer network function. As such, an unnecessary interaction between the consumer network function and the first NWDAF network function is avoided, which further improves the utilization rate of the system resource.

In an embodiment, the obtaining the UE location includes:

obtaining the UE location from an access and mobility management function (AMF) network function serving the UE.

For example, the obtaining the UE location includes the following steps.

Firstly, the first NWDAF network function transmits a subscription request message for the UE location to the AMF network function serving the UE.

After the AMF network function receives the subscription request message for the UE location transmitted by the first NWDAF network function, the AMF network function responds the UE location to the first NWDAF network function.

Secondly, after the AMF network function responds the UE location to the first NWDAF network function, the first NWDAF network function receives the UE location transmitted by the AMF network function.

According to the method for data analytics provided by the present application, by determining whether the UE location obtained from the AMF network function is within the serving area of the first NWDAF network function, the utilization rate of the system resource is further improved.

In an embodiment, the determining, based on the analytics ID, whether the first NWDAF network function is able to provide the data analytics service to the consumer network function includes:

determining a network function (NF) providing metadata based on the analytics ID;

obtaining a serving area of the NF;

if the serving area of the NF is within a serving area of the first NWDAF network function, determining that the first NWDAF network function is able to provide the data analytics service to the consumer network function; and if the serving area of the NF is not within the serving area of the first NWDAF network function, determining that the first NWDAF network function is not able to provide the data analytics service to the consumer network function.

In an embodiment, the determining, based on the analytics ID, whether the first NWDAF network function is able to provide the data analytics service to the consumer network function includes the following steps.

Firstly, the NF providing metadata required by the data analytics is determined based on the analytics ID, where the metadata is needed to be obtained for the data analytics corresponding to the analytics ID.

The serving area of the NF is obtained.

Secondly, whether the serving area of the NF is within the serving area of the first NWDAF network function is determined.

If the serving area of the NF is within the serving area of the first NWDAF network function, it is determined that the first NWDAF network function is able to provide the data analytics service to the consumer network function.

If the serving area of the NF is not within the serving area of the first NWDAF network function, it is determined that the first NWDAF network function is not able to provide the data analytics service to the consumer network function.

According to the method for data analytics provided by the present application, by determining whether the serving area of the NF is within the serving area of the first NWDAF network function, the utilization rate of the system resource is further improved.

In an embodiment, determining the serving area of the NF providing metadata includes:

determining a network function ID of the NF providing metadata based on the analytics ID; and querying, based on the network function ID of the NF, the serving area of the NF corresponding to the network function ID of the NF from a network repository function (NRF) network function; or querying the serving area of the NF from the NF corresponding to the network function ID of the NF.

In an embodiment, the first NWDAF network function determines the serving area of the NF providing metadata includes the following steps.

Firstly, the network function ID of the NF providing metadata (NF ID) is determined based on the analytics ID.

Secondly, the first NWDAF network function transmits a querying message to the NRF network function, where the querying message includes the NF ID.

After the NRF network function receives the querying message, the NRF network function transmits a response message to the first NWDAF network function.

After the first NWDAF network function receives the response message transmitted by the NRF network function, the first NWDAF network function determines the serving area of the NF based on the response message transmitted by the NRF network function.

Or, the first NWDAF network function transmits the querying message to the NF, and after the NF receives the querying message, the NF responds the serving area of the NF to the first NWDAF network function.

According to the method for data analytics provided by the present application, by determining whether the serving area of the NF is within the serving area of the first NWDAF network function, the utilization rate of system resource is further improved.

In an embodiment, after the determining that the other NWDAF network function provides the consumer network function with the data analytics result corresponding to the analytics ID, the method further includes:

transmitting an Nnrf_NFDiscovery_Request message to the NRF network function, where the Nnrf_NFDiscovery_Request message includes the UE location or serving area information of the NF providing metadata; and receiving a candidate NWDAF network function list transmitted by the NRF network function, where the candidate NWDAF network function list is determined by the NRF network function based on the UE location or the serving area information of the NF providing metadata, and the candidate NWDAF network function list includes a second NWDAF network function being able to provide the consumer network function with the data analytics result corresponding to the analytics ID.

In an embodiment, after determining that other NWDAF network function provides the consumer network function with the data analytics result corresponding to the analytics ID, the method further includes the following steps:

Firstly, the first NWDAF network function transmits the Nnrf_NFDiscovery_Request message to the NRF network function.

The Nnrf_NFDiscovery_Request message includes the UE location or the serving area information of the NF providing metadata.

The NRF network function receives the Nnrf_NFDiscovery_Request message transmitted by the first NWDAF network function.

After the NRF network function receives the Nnrf_NFDiscovery_Request message transmitted by the first NWDAF network function, the NRF network function determines the candidate NWDAF network function list based on the UE location or the serving area information of the NF providing metadata.

The candidate NWDAF network function list includes multiple NWDAF network functions which is able to provide the data analytics result corresponding to the analytics ID to the consumer network function.

The NRF network function transmits the candidate NWDAF network function list to the first NWDAF network function.

Secondly, the first NWDAF network function receives the candidate NWDAF network function list transmitted by the NRF network function.

The candidate NWDAF network function list includes the second NWDAF network function which is able to provide the data analytics result corresponding to the analytics ID to the consumer network function.

According to the method for data analytics provided by the present application, based on the candidate NWDAF network function list transmitted by the NRF network function, the utilization rate of the system resource is further improved.

In an embodiment, the method further includes:
transmitting the candidate NWDAF network function list to the consumer network function, or
transmitting the second NWDAF network function determined based on the candidate NWDAF network function list to the consumer network function.

In an embodiment, after the first NWDAF network function receives the candidate NWDAF network function list transmitted by the NRF network function, the first NWDAF network function determines whether a request redirection indication information from the consumer network function is received. In case that the request redirection indication information is not received, the first NWDAF network function directly transmits the candidate NWDAF network function list to the consumer network function.

The consumer network function receives the candidate NWDAF network function list transmitted by the first NWDAF network function.

The candidate NWDAF network function list includes ID of at least one candidate NWDAF network function.

The consumer network function selects one candidate NWDAF network function from the candidate NWDAF network function list, and takes the selected NWDAF network function as the second NWDAF network function.

The consumer network function transmits a third analytics request message to the second NWDAF network function based on the ID of the second NWDAF network function.

The third analytics request message includes the analytics ID.

The second NWDAF network function receives the third analytics request message transmitted by the consumer network function.

After the second NWDAF network function receives the third analytics request message transmitted by the consumer network function, the second NWDAF network function performs data analytics based on the analytics ID included in the third analytics request message, and provides the data analytics result to the consumer network function corresponding to the ID of the consumer network function.

In an embodiment, the third analytics request message further includes the UE location or the serving area information of the NF providing metadata.

After the second NWDAF network function receives the third analytics request message transmitted by the consumer network function, the second NWDAF network function performs data analytics based on the UE location or the serving area information of the NF providing metadata included in the third analytics request message, and provides the data analytics result to the consumer network function corresponding to the ID of the consumer network function.

The consumer network function receives the data analytics result provided by the second NWDAF network function.

In an embodiment, after the first NWDAF network function receives the candidate NWDAF network function list transmitted by the NRF network function, the first NWDAF network function determines whether the request redirection indication information from the consumer network function is received. In case that the request redirection indication information is not received, the first NWDAF network function may select a candidate NWDAF network function from the candidate NWDAF network function list as the second NWDAF network function.

After the first NWDAF network function determines an ID of the second NWDAF network function, the first NWDAF network function transmits the ID of the second NWDAF network function to the consumer network function.

The consumer network function receives the ID of the second NWDAF network function transmitted by the first NWDAF network function.

The consumer network function transmits the third analytics request message to the second NWDAF network function based on the ID of the second NWDAF network function.

After the second NWDAF network function receives the third analytics request message transmitted by the consumer network function, the second NWDAF network function determines the data analytics result corresponding to the analytics ID based on the third analytics request message, and transmits the data analytics result corresponding to the analytics ID to the consumer network function.

The consumer network function receives the data analytics result corresponding to the analytics ID transmitted by the second NWDAF network function.

According to the method for data analytics provided by the present application, in case that the first NWDAF network function does not receive the request redirection indication information from the consumer network function, the consumer network function request the second NWDAF network function to perform data analytics, which further improves the utilization rate of the system resource.

In an embodiment, the method further includes:
selecting a candidate NWDAF network function, from the candidate NWDAF network function list, as the second NWDAF network function; and
transmitting a second analytics request message to the second NWDAF network function, where the second analytics request message includes an ID of the consumer network function and the analytics ID.

In an embodiment, after the first NWDAF network function receives the candidate NWDAF network function list transmitted by the NRF network function, the first NWDAF network function determines whether the request redirection indication information from the consumer network function is received.

In case that the request redirection indication information from the consumer network function is received, the first NWDAF network function selects one candidate NWDAF network function from the candidate NWDAF network function list as the second NWDAF network function.

The first NWDAF network function transmits the second analytics request message to the second NWDAF network function.

The second analytics request message includes the ID of the consumer network function and the analytics ID.

After the second NWDAF network function receives the second analytics request message transmitted by the first NWDAF network function, the second NWDAF network function transmits analytics response message to the consumer network function corresponding to the ID of the consumer network function.

The analytics response message is used to characterize that the second NWDAF network function provides the data analytics service to the consumer network function, which avoids the situation that the consumer network function may repeatedly transmit the analytics request message to the first NWDAF network function.

After the second NWDAF network function receives the second analytics request message transmitted by the first NWDAF network function, the second NWDAF network function performs data analytics based on the analytics ID included in the second analytics request message, generates the data analytics result corresponding to the analytics ID, and transmits the data analytics result corresponding to the analytics ID to the consumer network function.

The consumer network function receives the data analytics result provided by the second NWDAF network function.

According to the method for data analytics provided by the present application, in case that the first NWDAF network function receives the request redirection indication information transmitted by the consumer network function, the first NWDAF network function transmits the analytics request message to the second NWDAF network function, which further improves the utilization rate of the system resource.

Figure 5:
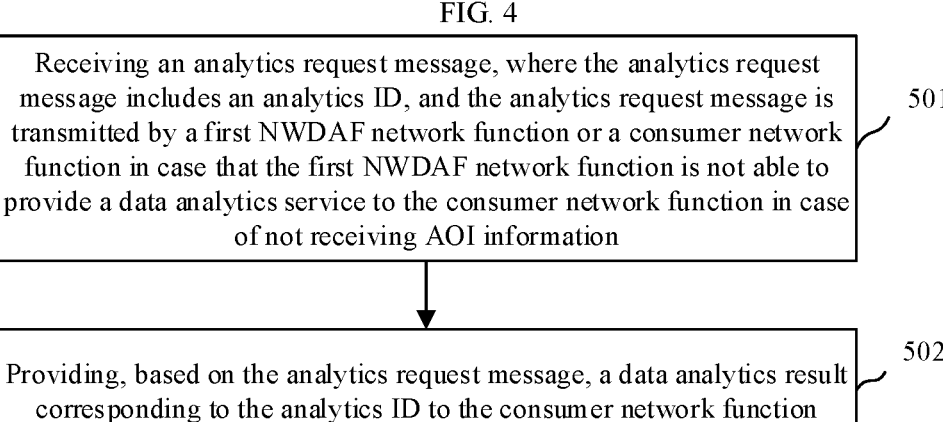
FIG. 5 is a second schematic flow diagram of a method for data analytics according to an embodiment of the present application.

FIG. 5 is a second schematic flow diagram of a method for data analytics according to an embodiment of the present application. As shown in FIG. 5, an embodiment of the present application provides a method for data analytics, an execution entity of the method for data analytics is a second NWDAF network function, the method includes the following steps:

step 501: receiving an analytics request message, where the analytics request message includes an analytics identifier (ID), and the analytics request message is transmitted by a first NWDAF network function or a consumer network function in case that the first NWDAF network function is not able to provide the data analytics service to the consumer network function in case of not receiving area of interest (AOI) information; and step 502: providing, based on the analytics request message, a data analytics result corresponding to the analytics ID to the consumer network function.

In an embodiment, in case that the analytics request message is transmitted by the first NWDAF network function, the analytics request message further includes an ID of the consumer network function.

The method further includes:

transmitting an analytics response message to the consumer network function corresponding to the ID of the consumer network function, where the analytics response message is used to characterize that a second NWDAF network function provides the data analytics service to the consumer network function.

The providing, based on the analytics request message, the data analytics result corresponding to the analytics ID to the consumer network function includes:

performing the data analytics based on the analytics ID included in the analytics request message, and providing the consumer network function corresponding to the ID of the consumer network function with the data analytics result.

In an embodiment, the analytics request message further includes the UE location or the serving area information of the NF providing metadata.

The providing, based on the analytics request message, the data analytics result corresponding to the analytics ID to the consumer network function includes:

performing data analytics based on the UE location or the serving area information of the NF providing metadata included in the analytics request message and providing the data analytics result corresponding to the analytics ID to the consumer network function.

Since the embodiments which take the first NWDAF network function as the execution entity applied to the above embodiments of the present application, and may achieve same technical result, the similar part or beneficial effect is not repeated herein.

FIG. 6 is a third schematic flow diagram of a method for data analytics according to an embodiment of the present application. As shown in FIG. 6, an embodiment of the present application provides a method for data analytics, an execution entity of the method for data analytics is a consumer network function, the method includes:

step 601: transmitting a first analytics request message to a first network data analytics function (NWDAF) network function, where the first analytics request message includes an analytics identifier (ID); and step 602: receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

In an embodiment, the receiving the data analytics result corresponding to the analytics ID transmitted by the second NWDAF network function includes:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

In an embodiment, the receiving the data analytics result corresponding to the analytics ID transmitted by the second NWDAF network function, includes:

receiving a candidate NWDAF network function list transmitted by the first NWDAF network function, where the candidate NWDAF network function list includes ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, where the third analytics request message includes the analytics ID; and receiving the data analytics result corresponding to the analytics ID transmitted by the second NWDAF network function.

Since the embodiments which take the first NWDAF network function as the execution entity applied to the above embodiments of the present application, and may achieve the same technical result, the similar part or beneficial effect is not repeated herein.

The method in the above embodiments is further illustrated in the following embodiments.

The method for data analytics may be generalized in the following steps.

1. After an old NWDAF network function receives the analytics request message transmitted by the consumer network function, the old NWDAF network function determines location of an NF providing metadata or a UE.

2. In case that the NF is not within its serving area or the UE location is not within the serving area of the NWDAF network function, the old NWDAF network function re-queries the target NWDAF network function.

3. The old NWDAF network function responds the target NWDAF network function to the consumer network function and triggers an NWDAF reselection process.

Embodiment 1

The old NWDAF network function determines whether to perform data analytics or NWDAF discovery based on an analytics identifier (ID).

FIG. 7 is a first logical flow diagram of data analytics according to an embodiment of the present application. As shown in FIG. 7, the old NWDAF network function receives an analytics request/subscription from a consumer network function, and determines the followings based on the analytics ID:

if the UE location is required for the data analytics, for example, the analytics ID indicates that analytics for UE mobility, abnormal behavior, etc. is required, subscribing the UE location from an AMF serving the UE; and if the UE location is not required for the data analytics, for example, the analytics ID indicates that analytics for UE communication, service experience, NF load information, etc. is required, determining metadata required for the data analytics, to determine an ID of an NF providing metadata (NF ID).

The NF ID is used to query an NRF to obtain a profile of the NF, where the profile of the NF includes at least a serving area of the NF; or the serving area of the NF is obtained from the NF.

The old NWDAF network function determines whether the UE location or the serving area of the NF is within the serving area of the old NWDAF network function, if not, it is determined that an NWDAF network function is needed to re-selected to provide the data analytics corresponding to the analytics ID to the consumer network function.

Embodiment 2

The old NWDAF network function performs NWDAF discovery.

1. The old NWDAF network function transmits an NF discovery request to an NRF network function, the NF discovery request includes a UE location or a serving area of a specified NF.

2. The NRF network function responds a candidate NWDAF network function list to the old NWDAF network function, and the old NWDAF network function selects one NWDAF network function from the candidate NWDAF network function list as a target NWDAF network function.

Embodiment 3

The old NWDAF network function requests data analytics from a target NWDAF network function.

Figures 8, 9:
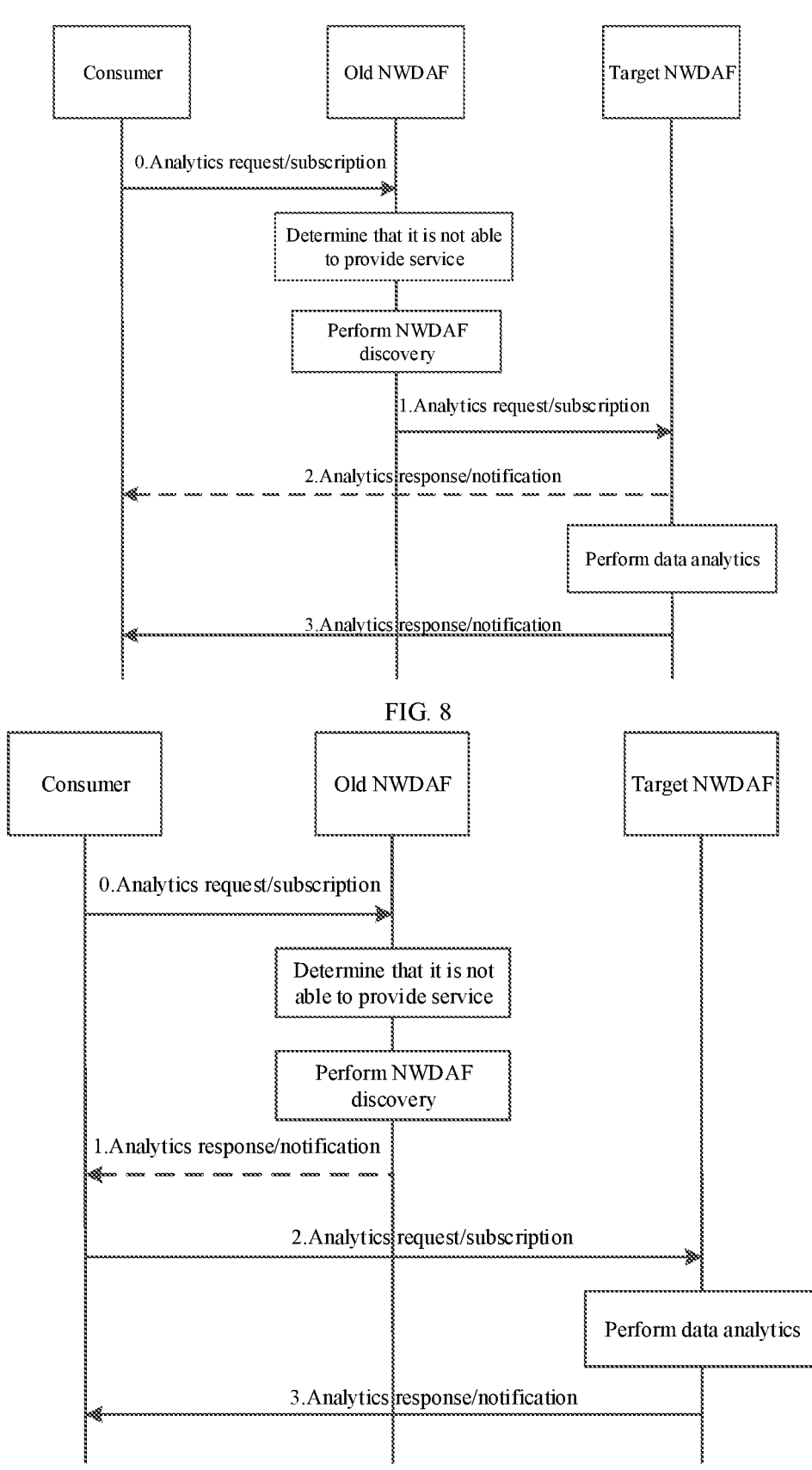
FIG. 8 is a first schematic diagram of signaling interaction for data analytics according to an embodiment of the present application.
FIG. 9 is a second schematic diagram of signaling interaction for data analytics according to an embodiment of the present application.

FIG. 8 is a first schematic diagram of signaling interaction of data analytics according to an embodiment of the present application. As shown in FIG. 8, the signaling interaction procedure of the old NWDAF network function requesting the data analytics from the target NWDAF network function is as follows.

0. The old NWDAF network function receives an analytics request/subscription message from a consumer network function, and determines, based on the embodiment 1, that NWDAF discovery needs to be performed.

1. After the old NWDAF network function determines a target NWDAF network function by performing the NWDAF discovery based on the embodiment 1, the old NWDAF network function forwards the analytics request/subscription message transmitted by the consumer network function to the target NWDAF network function, and sets the field of "target of analytics reporting" as "consumer" in the analytics request/subscription message.

In addition, the old NWDAF network function also transmits a UE location or a NF providing metadata to the target NWDAF network function, where the profile of NF includes an NF ID or an IP address, etc.

2. After the target NWDAF network function receives the analytics request/subscription message transmitted by the old NWDAF network function, in case that the "target of analytics reporting" does not indicate the old NWDAF network function, an immediate response to the consumer network function indicated by the "target of analytics reporting" is needed, which may avoid a further transmitting of related analytics request/subscription message to the old NWDAF network function.

3. The target NWDAF network function performs data analytics by using the UE location or the NF profile provided by the old NWDAF network function, and responds an analytics result to the consumer network function.

Embodiment 4

The consumer network function requests data analytics from a target NWDAF network function.

FIG. 9 is a second schematic diagram of signaling interaction of data analytics according to an embodiment of the present application. As shown in FIG. 9, the signaling interaction procedure of the consumer network function requesting the data analytics from the target NWDAF network function is as follows.

1. After the old NWDAF network function determines a candidate NWDAF network function list by performing an NWDAF discovery, the old NWDAF network function responds the candidate NWDAF network function list to the consumer network function, or responds information of the target NWDAF network function determined based on the candidate NWDAF network function list to the consumer network function.

2. After the consumer network function receives the response from the old NWDAF network function, the consumer network function determines the target NWDAF network function based on the target NWDAF network function in the response message, or selects the target NWDAF network function based on the candidate NWDAF network function list in the response message, and then re-transmits an analytics request/subscription message to the target NWDAF network function.

3. The consumer network function obtains a data analytics result from the target NWDAF network function.

Embodiment 5

The consumer network function indicates the old NWDAF network function to perform a redirection of the analytics request.

Figure 10:
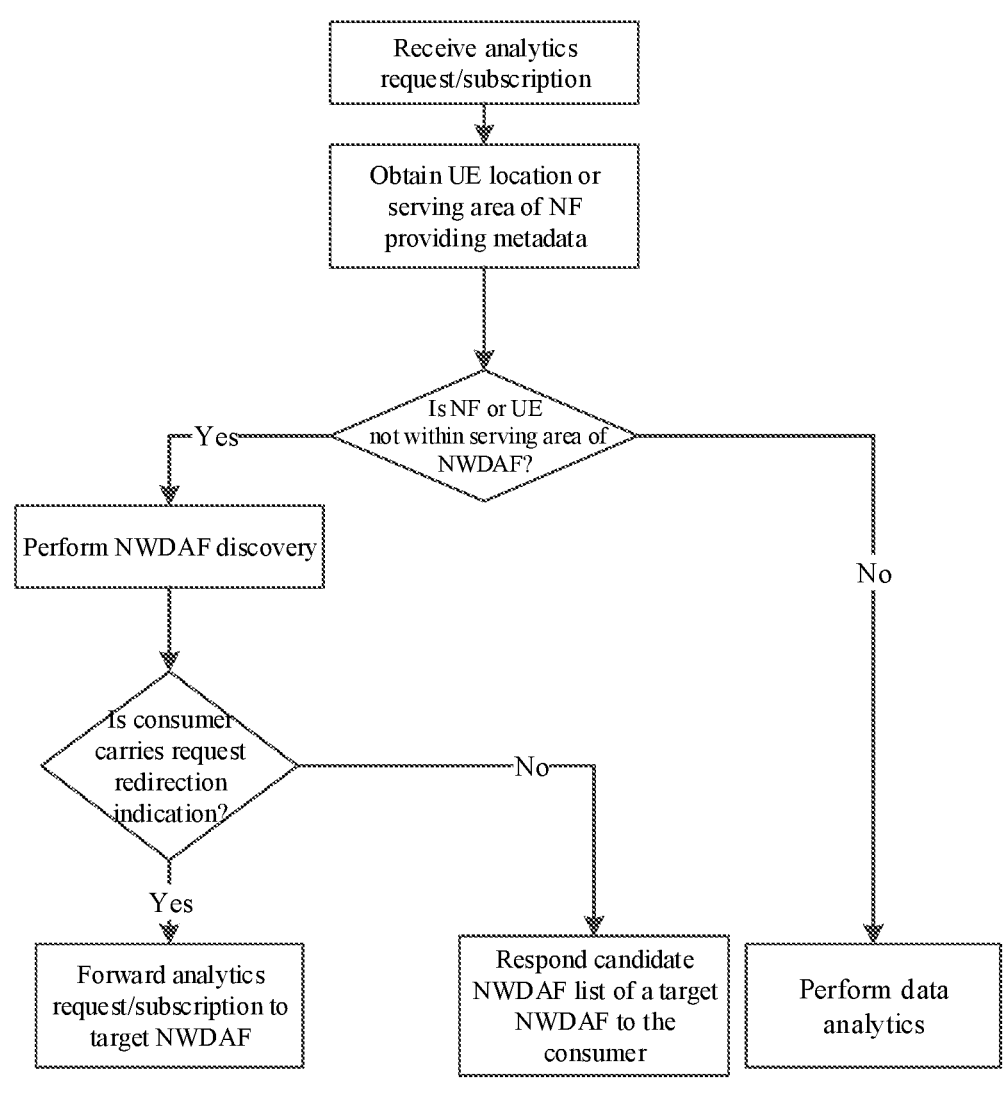
FIG. 10 is a second logical flow diagram of data analytics according to an embodiment of the present application.

FIG. 10 is a second logical flow diagram of data analytics according to an embodiment of the present application. As shown in FIG. 10, the logical flow of the consumer network function indicating the old NWDAF network function to perform the redirection is as follows.

1. The consumer network function transmits an analytics request/subscription message to the old NWDAF network function, where the analytics request/subscription message includes a request redirection indication, as such, the old NWDAF network function may forward an analytics request to other NWDAF network function in case that the old NWDAF network function is not able to provide data analytics.

2. In case the old NWDAF network function determines, based on the embodiment 1, that an NF providing metadata or a UE is not within a serving area of the old NWDAF network function, the old NWDAF network function performs NWDAF discovery to obtain a target NWDAF network function.

3. Based on the request redirection indication transmitted by the consumer network function, the old NWDAF network function determines the target NWDAF network function, and forwards an analytics request/subscription message to the target NWDAF network function; and in case that the consumer network function does not transmit the request redirection indication, the old NWDAF network function responds the information of the target NWDAF network function or a candidate NWDAF network function list to the consumer network function.

Figure 11:
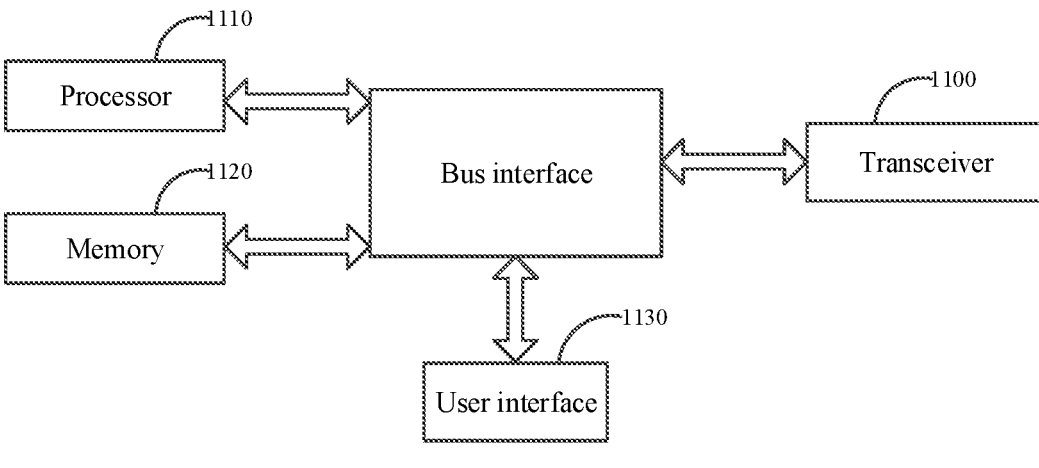
FIG. 11 is a schematic structural diagram of a first NWDAF network function according to an embodiment of the present application.

FIG. 11 is a schematic structural diagram of a first NWDAF network function according to an embodiment of the present application. As shown in FIG. 11, the first network data analytics function (NWDAF) network function includes a memory 1120, a transceiver 1100 and a processor 1110, where the memory 1120 is used for storing computer programs; the transceiver 1100 is used for transmitting and receiving data under the control of the processor 1100; and the processor 1100 is used for reading the computer program in the memory 1120 and executing the following operations:

receiving a first analytics request message transmitted by a consumer network function, where the first analytics request message includes an analytics identifier (ID); and determining, based on the first analytics request message, that the first NWDAF network function or other NWDAF network function provides the consumer network function with a data analytics result corresponding to the analytics ID.

The transceiver 1100 is used for transmitting and receiving data under the control of the processor 1100.

In FIG. 11, a bus architecture may include any number of interconnected buses and bridges, linked together by various circuits of one or more processors represented by processor 1110 and circuits of memories represented by memory 1120.

The bus architecture may also link various other circuits such as peripheral devices, regulators and power management circuits. The bus architecture provides an interface. The transceiver 1100 may be multiple components, that is, including a transmitter and a receiver, providing devices for communication with various other devices on transmission media such as wireless channels, wired channels, optical fibers, etc. For different user devices, the user interface 1130 may also be an interface capable of connecting external and internal devices, including but not limited to small keyboards, displays, speakers, microphones, joysticks, etc.

The processor 1110 is used for managing the bus architecture and general processing. The memory 1120 may store data used by the processor 1110 in case of performing operations.

In an embodiment, the processor 1110 may be a central processing unit (CPU), an application specific integrated circuit (ASIC), a field-programmable gate array (FPGA), or a complex programmable logic device (CPLD). The processor 1110 may also adopt a multi-core architecture.

The processor is used for reading the computer program in the memory and executing any of the method provided by the embodiments in the present application according to obtained executable instructions. The processor and the memory may be physically separated.

It should be noted that the first NWDAF network function in the embodiments of the present application can implement all the methods provided by the above-mentioned embodiments which takes the first NWDAF network function as the execution entity and achieve the same effect. The same parts and beneficial effects as the method embodiments are not repeated herein.

In an embodiment, the determining, based on the first analytics request message, that the first NWDAF network function or other NWDAF network function provides the consumer network function with the data analytics result corresponding to the analytics ID includes:

in case that the first analytics request message does not include area of interest (AOI) information, determining whether the first NWDAF network function is able to provide a data analytics service to the consumer network function based on the analytics ID, if the first NWDAF network function is able to provide the data analytics service to the consumer network function, determining that the first NWDAF network function provides the consumer network function with the data analytics result corresponding to the analytics ID; or if the first NWDAF network function is not able to provide the data analytics service to the consumer network function, determining that other NWDAF network function provides the consumer network function with the data analytics result corresponding to the analytics ID.

In an embodiment, the determining, based on the analytics ID, whether the first NWDAF network function is able to provide the data analytics service to the consumer network function includes:

obtaining the UE location in case that a user equipment (UE) location is required for data analytics corresponding to the analytics ID;

if the UE location is within a serving area of the first NWDAF network function, determining that the first NWDAF network function is able to provide the data analytics service to the consumer network function; and if the UE location is not within the serving area of the first NWDAF network function, determining that the first NWDAF network function is not able to provide the data analytics service to the consumer network function.

In an embodiment, the determining, based on the first analytics request message, that other NWDAF network function provides the consumer network function with the data analytics result corresponding to the analytics ID includes:

in case that it is determined, based on the first analytics request message, that the first NWDAF network function is not able to provide the data analytics service to the consumer network function, determining the other NWDAF network function, where the other NWDAF network function is used for providing the consumer network function with the data analytics result corresponding to the analytics ID.

In an embodiment, determining that the first NWDAF network function is not able to provide the data analytics service to the consumer network function includes:

obtaining a UE location based on data analytics corresponding to the analytics ID; and if the UE location is not within the serving area of the first NWDAF network function, determining that the first NWDAF network function is not able to provide the data analytics service to the consumer network function.

In an embodiment, the obtaining the UE location includes:

obtaining the UE location from an access and mobility management function (AMF) network function serving the UE.

In an embodiment, the determining, based on the analytics ID, whether the first NWDAF network function is able to provide the data analytics service to the consumer network function includes:

determining a network function (NF) providing metadata based on the analytics ID;

obtaining a serving area of the NF;

if the serving area of the NF is within a serving area of the first NWDAF network function, determining that the first NWDAF network function is able to provide the data analytics service to the consumer network function; and if the serving area of the NF is not within the serving area of the first NWDAF network function, determining that the first NWDAF network function is not able to provide the data analytics service to the consumer network function.

In an embodiment, determining the serving area of the NF providing metadata includes:

determining a network function ID of the NF providing metadata based on the analytics ID; and querying, based on the network function ID of the NF, the serving area of the NF corresponding to the network function ID of the NF from a network repository function (NRF) network function; or querying the serving area of the NF from the NF corresponding to the network function ID of the NF.

In an embodiment, after the determining that other NWDAF network function provides the consumer network function with the data analytics result corresponding to the analytics ID, the processor is further used for:

transmitting an Nnrf_NFDiscovery_Request message to the NRF network function, where the Nnrf_NFDiscovery_Request message includes the UE location or serving area information of the NF providing metadata; and receiving a candidate NWDAF network function list transmitted by the NRF network function, where the candidate NWDAF network function list is determined by the NRF network function based on the UE location or the serving area information of the NF providing metadata, and the candidate NWDAF network function list includes a second NWDAF network function being able to provide the consumer network function with the data analytics result corresponding to the analytics ID.

In an embodiment, the processor is further used for:

transmitting the candidate NWDAF network function list to the consumer network function, or transmitting the second NWDAF network function determined based on the candidate NWDAF network function list to the consumer network function.

In an embodiment, the processor is further used for:

selecting a candidate NWDAF network function, from the candidate NWDAF network function list, as the second NWDAF network function; and transmitting a second analytics request message to the second NWDAF network function, where the second analytics request message includes an ID of the consumer network function and the analytics ID.

Figures 12, 13, 14, 15:
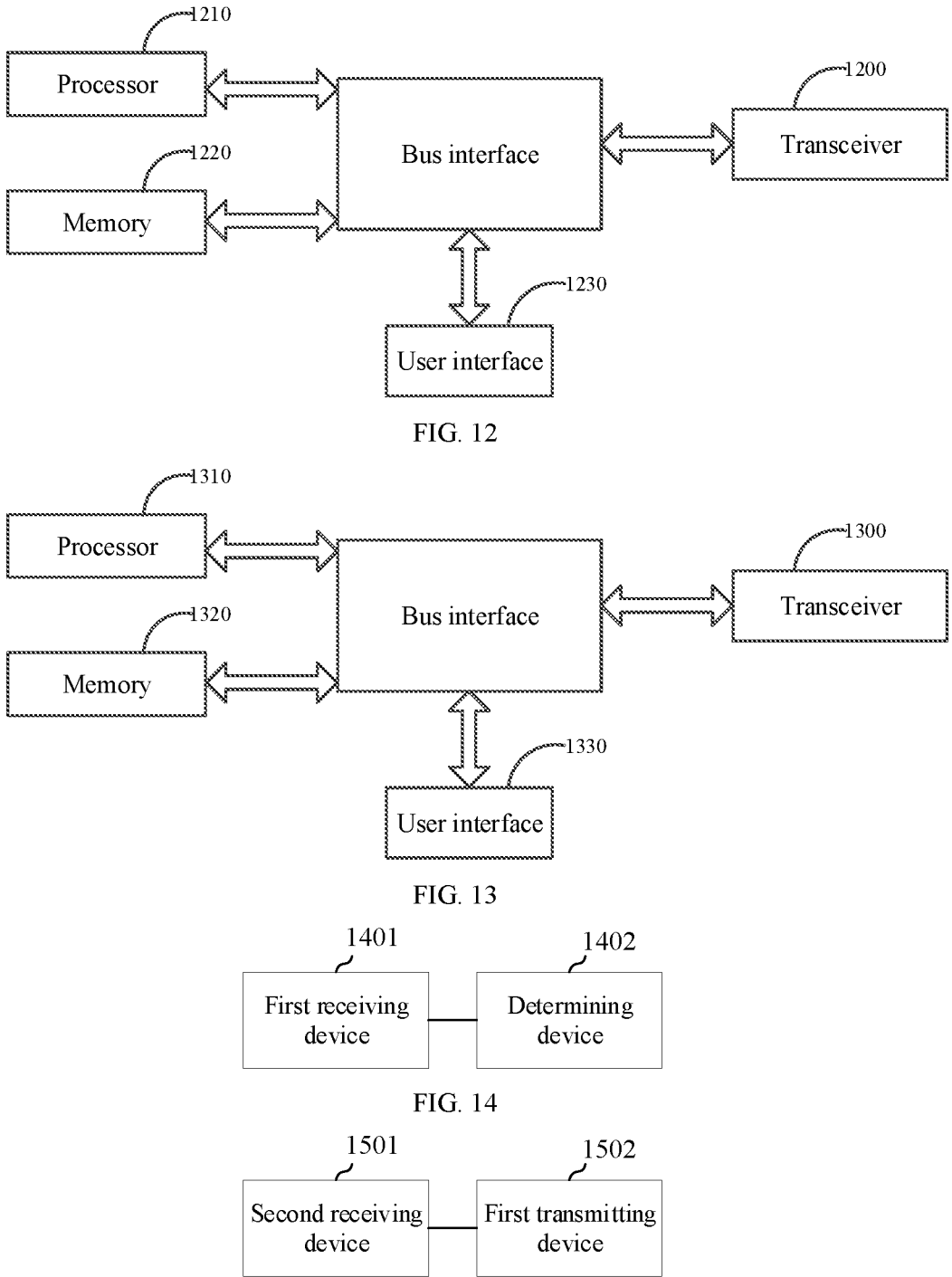
FIG. 12 is a schematic structural diagram of a second NWDAF network function according to an embodiment of the present application.
FIG. 13 is a schematic structural diagram of a consumer network function according to an embodiment of the present application.
FIG. 14 is a first schematic structural diagram of an apparatus for data analytics according to an embodiment of the present application.
FIG. 15 is a second schematic structural diagram of an apparatus for data analytics according to an embodiment of the present application.

FIG. 12 is a schematic structural diagram of a second network data analytics function (NWDAF) network function according to an embodiment of the present application. As shown in FIG. 12, the second NWDAF includes a memory 1220, a transceiver 1200 and a processor 1210, where the memory 1220 is used for storing computer programs; the transceiver 1200 is used for transmitting and receiving data under the control of the processor 1210; and the processor 1210 is used for reading the computer program in the memory 1220 and executing the following operations:

receiving an analytics request message, where the analytics request message includes an analytics identifier (ID), and the analytics request message is transmitted by a first NWDAF network function or a consumer network function in case that the first NWDAF network function is not able to provide the data analytics service to the consumer network function in case of not receiving area of interest (AOI) information; and providing, based on the analytics request message, a data analytics result corresponding to the analytics ID to the consumer network function.

The transceiver 1200 is used for transmitting and receiving data under the control of the processor 1210.

In FIG. 12, a bus architecture may include any number of interconnected buses and bridges, linked together by various circuits of one or more processors represented by processor 1210 and circuits of memories represented by memory 1220. The bus architecture may also link various other circuits such as peripheral devices, regulators and power management circuits. The bus architecture provides an interface. The transceiver 1200 may be multiple components, that is, including a transmitter and a receiver, providing devices for communication with various other devices on transmission media such as wireless channels, wired channels, optical fibers, etc. For different user devices, the user interface 1230 may also be an interface capable of connecting external and internal devices, including but not limited to small keyboards, displays, speakers, microphones, joysticks, etc.

The processor 1210 is used for managing the bus architecture and general processing. The memory 1220 may store data used by the processor 1210 in case of performing operations.

In an embodiment, the processor 1210 may be a central processing unit (CPU), an application specific integrated circuit (ASIC), a field-programmable gate array (FPGA), or a complex programmable logic device (CPLD). The processor 1210 may also adopt a multi-core architecture.

The processor is used for reading the computer program in the memory and executing any of the method provided by the embodiments in the present application according to obtained executable instructions. The processor and the memory may be physically separated.

It should be noted that, the second NWDAF network function in the embodiments of the present application can implement all the methods provided by the above-mentioned embodiments which takes the second NWDAF network function as the execution entity and achieve the same effect. The same parts and beneficial effects as the method embodiments are not repeated herein.

In an embodiment, in case that the analytics request message is transmitted by the first NWDAF network function, the analytics request message further includes an ID of the consumer network function, the processor is further used for:

transmitting an analytics response message to the consumer network function corresponding to the ID of the consumer network function, where the analytics response message is used to characterize that a second NWDAF network function provides the data analytics service to the consumer network function;

the providing, based on the analytics request message, the data analytics result corresponding to the analytics ID to the consumer network function includes:

performing data analytics based on the analytics ID included in the analytics request message and providing the consumer network function corresponding to the ID of the consumer network function with the data analytics result.

In an embodiment, the analytics request message further includes a UE location or serving area information of an NF providing metadata, the providing, based on the analytics request message, the data analytics result corresponding to the analytics ID to the consumer network function includes:

performing data analytics based on the UE location or the serving area information of the NF providing metadata included in the analytics request message and providing the data analytics result corresponding to the analytics ID to the consumer network function.

FIG. 13 is a schematic structural diagram of a consumer network function according to an embodiment of the present application. As shown in FIG. 13, the consumer network function includes a memory 1320, a transceiver 1300, a processor 1310, where the memory 1320 is used for storing computer programs; the transceiver 1300 is used for transmitting and receiving data under the control of the processor 1310; and the processor 1310 is used for reading the computer program in the memory 1320 and executing the following operations:

transmitting a first analytics request message to a first network data analytics function (NWDAF) network function, where the first analytics request message includes an analytics identifier (ID); and receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

The transceiver 1300 is used for transmitting and receiving data under the control of the processor 1310.

In FIG. 13, a bus architecture may include any number of interconnected buses and bridges, linked together by various circuits of one or more processors represented by processor 1310 and circuits of memories represented by memory 1320. The bus architecture may also link various other circuits such as peripheral devices, regulators and power management circuits. The bus architecture provides an interface. The transceiver 1300 may be multiple components, that is, including a transmitter and a receiver, providing devices for communication with various other devices on transmission media such as wireless channels, wired channels, optical fibers, etc. For different user devices, the user interface 1330 may also be an interface capable of connecting external and internal devices, including but not limited to small keyboards, displays, speakers, microphones, joysticks, etc.

The processor 1310 is used for managing the bus architecture and general processing. The memory 1320 may store data used by the processor 1310 in case of performing operations.

In an embodiment, the processor 1310 may be a central processing unit (CPU), an application specific integrated circuit (ASIC), a field-programmable gate array (FPGA), or a complex programmable logic device (CPLD). The processor 1310 may also adopt a multi-core architecture.

The processor is used for reading the computer program in the memory and executing any of the method provided by the embodiments in the application according to obtained executable instructions. The processor and the memory may be physically separated.

It should be noted that, the consumer network function in the embodiments of the present application can implement all the methods provided by the above-mentioned embodiments which takes the consumer network function as the execution entity and achieve the same effect. The same parts and beneficial effects as the method embodiments are not repeated herein.

In an embodiment, the receiving the data analytics result corresponding to the analytics ID transmitted by the second NWDAF network function includes:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

In an embodiment, the receiving the data analytics result corresponding to the analytics ID transmitted by the second NWDAF network function includes:

receiving a candidate NWDAF network function list transmitted by the first NWDAF network function, where the candidate NWDAF network function list includes ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, where the third analytics request message includes the analytics ID; and receiving the data analytics result corresponding to the analytics ID transmitted by the second NWDAF network function.

FIG. 14 is a first schematic structural diagram of an apparatus for data analytics according to an embodiment of the present application. As shown in FIG. 14, an embodiment of the present application provides an apparatus for data analytics, including:

a first receiving device 1401, used for receiving a first analytics request message transmitted by a consumer network function, where the first analytics request message includes an analytics identifier (ID); and a determining device 1402, used for determining, based on the first analytics request message, that the first NWDAF network function or other NWDAF network function provides the consumer network function with a data analytics result corresponding to the analytics ID.

In an embodiment, the determining device includes a determining subdevice and a processing subdevice, and in case that the first analytics request message does not include area of interest (AOI) information, the determining subdevice is used for determining whether the first NWDAF network function is able to provide a data analytics service to the consumer network function based on the analytics ID, if the first NWDAF network function is able to provide the data analytics service to the consumer network function, the processing subdevice is used for determining that the first NWDAF network function provides the consumer network function with the data analytics result corresponding to the analytics ID; or if the first NWDAF network function is not able to provide the data analytics service to the consumer network function, the processing subdevice is used for determining that other NWDAF network function provides the consumer network function with the data analytics result corresponding to the analytics ID.

In an embodiment, the determining subdevice includes a first obtaining device and a first determining device, and the first obtaining device is used for obtaining the UE location in case that a user equipment (UE) location is required for data analytics corresponding to the analytics ID;

if the UE location is within a serving area of the first NWDAF network function, the first determining device is used for determining that the first NWDAF network function is able to provide the data analytics service to the consumer network function; and if the UE location is not within the serving area of the first NWDAF network function, the first determining device is used for determining that the first NWDAF network function is not able to provide the data analytics service to the consumer network function.

In an embodiment, the determining device includes a first determining subdevice and a second determining subdevice, and the first determining subdevice is used for determining, based on the first analytics request message, that the first NWDAF network function is not able to provide the data analytics service to the consumer network function; and if it is determined that the first NWDAF network function is not able to provide the data analytics service to the consumer network function, the second determining subdevice is used for determining the other NWDAF network function, where the other NWDAF network function is used for providing the consumer network function with the data analytics result corresponding to the analytics ID.

In an embodiment, the first determining subdevice includes a third obtaining device and a fourth determining device, where the third obtaining device is used for obtaining a UE location based on the data analytics corresponding to the analytics ID; and if the UE location is not within a serving area of the first NWDAF network function, the fourth determining device is used for determining that the first NWDAF network function is not able to provide the data analytics service to the consumer network function.

In an embodiment, the first obtaining device is used for obtaining the UE location from an access and mobility management function (AMF) network function serving the UE.

In an embodiment, the determining subdevice includes a second determining device, a second obtaining device and a third determining device, where the second determining device is used for determining a network function (NF) providing metadata based on the analytics ID;

the second obtaining device is used for obtaining a serving area of the NF;

if the serving area of the NF is within a serving area of the first NWDAF network function, the third determining device is used for determining that the first NWDAF network function is able to provide the data analytics service to the consumer network function; and if the serving area of the NF is not within the serving area of the first NWDAF network function, the third determining device is used for determining that the first NWDAF network function is not able to provide the data analytics service to the consumer network function.

In an embodiment, the second obtaining device includes a first determining subdevice and a second determining subdevice, where the first determining subdevice is used for determining a network function ID of the NF providing metadata based on the analytics ID; and the second determining subdevice is used for querying, based on the network function ID of the NF, the serving area of the NF corresponding to the network function ID of the NF from a network repository function (NRF) network function; or querying the serving area of the NF from the NF corresponding to the network function ID of the NF.

In an embodiment, the determining device includes a first transmitting subdevice and a first receiving subdevice, where the first transmitting subdevice is used for transmitting an Nnrf_NFDiscovery_Request message to the NRF network function, where the Nnrf_NFDiscovery_Request message includes the UE location or serving area information of the NF providing metadata; and the first receiving subdevice is used for receiving a candidate NWDAF network function list transmitted by the NRF network function, where the candidate NWDAF network function list is determined by the NRF network function based on the UE location or the serving area information of the NF providing metadata, and the candidate NWDAF network function list includes a second NWDAF network function being able to provide the consumer network function with the data analytics result corresponding to the analytics ID.

In an embodiment, it further includes a third transmitting device, where the third transmitting device is used for transmitting the candidate NWDAF network function list to the consumer network function, or transmitting the second NWDAF network function determined based on the candidate NWDAF network function list to the consumer network function.

In an embodiment, the apparatus for data analytics further includes a selecting device and a fourth transmitting device, where the selecting device is used for selecting a candidate NWDAF network function, from the candidate NWDAF network function list, as the second NWDAF network function; and the fourth transmitting device is used for transmitting a second analytics request message to the second NWDAF network function, where the second analytics request message includes an ID of the consumer network function and the analytics ID.

The apparatus for data analytics provided in the embodiments of the present application can implement all the methods provided by the above-mentioned embodiments which takes the first NWDAF network function as the execution entity and achieve the same effect. The same parts and beneficial effects as the method embodiments are not repeated herein.

FIG. 15 is a second schematic structural diagram of an apparatus for data analytics according to an embodiment of the present application. As shown in FIG. 15, an embodiment of the present application provides an apparatus for data analytics, including:

a second receiving device 1501, used for receiving an analytics request message, where the analytics request message includes an analytics identifier (ID), and the analytics request message is transmitted by a first NWDAF network function or a consumer network function in case that the first NWDAF network function is not able to provide a data analytics service to the consumer network function in case of not receiving area of interest (AOI) information; and a first transmitting device 1502 is used for providing, based on the analytics request message, a data analytics result corresponding to the analytics ID to the consumer network function.

In an embodiment, in case that the analytics request message is transmitted by the first NWDAF network function, the analytics request message further includes an ID of the consumer network function;

the apparatus further includes a fifth transmitting device, where the fifth transmitting device is used for transmitting an analytics response message to the consumer network function corresponding to the ID of the consumer network function, where the analytics response message is used to characterize that a second NWDAF network function provides the data analytics service to the consumer network function; and the first transmitting device is used for performing data analytics based on the analytics ID included in the analytics request message and providing the consumer network function corresponding to the ID of the consumer network function with the data analytics result.

In an embodiment, the analytics request message further includes a user equipment (UE) location or serving area information of an NF providing metadata, the first transmitting device is used for performing data analytics based on the UE location or the serving area information of the NF providing metadata included in the analytics request message and providing the data analytics result corresponding to the analytics ID to the consumer network function.

The data analytics apparatus provided in the embodiments of the present application can implement all the methods provided by the above-mentioned embodiments which takes the second NWDAF network function as the execution entity and achieve the same effect. The same parts and beneficial effects as the method embodiments are not repeated herein.

Figure 16:
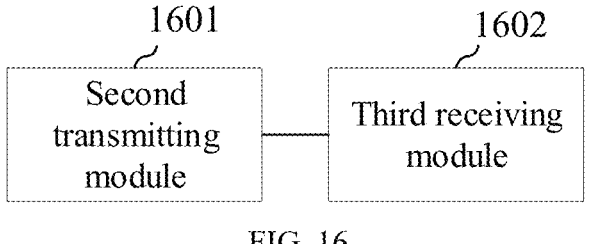
FIG. 16 is a third schematic structural diagram of an apparatus for data analytics according to an embodiment of the present application.

FIG. 16 is a third schematic structural diagram of an apparatus for data analytics according to an embodiment of the present application. As shown in FIG. 16, an embodiment of the present application provides an apparatus for data analytics, including:

a second transmitting device 1601, used for transmitting a first analytics request message to a first network data analytics function (NWDAF) network function, where the first analytics request message includes an analytics identifier (ID); and a third receiving device 1602, used for receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

In an embodiment, the third receiving device includes a second receiving subdevice and a third receiving subdevice, where the second receiving subdevice is used for receiving an ID of the second NWDAF network function transmitted by the first NWDAF network function; and the third receiving subdevice is used for determining the second NWDAF network function based on the ID of the second NWDAF network function, and receiving the data analytics result corresponding to the analytics ID transmitted by the second NWDAF network function.

In an embodiment, the third receiving device includes a fourth receiving subdevice, a selecting subdevice, a second transmitting subdevice and a fifth receiving subdevice, where the fourth receiving subdevice is used for receiving a candidate NWDAF network function list transmitted by the first NWDAF network function, where the candidate NWDAF network function list includes ID of at least one candidate NWDAF network function;

the selecting subdevice is used for selecting a target NWDAF network function from the candidate NWDAF network function list, and taking the target NWDAF network function as the second NWDAF network function;

the second transmitting subdevice is used for transmitting a third analytics request message to the second NWDAF network function based on an ID of the second NWDAF network function, where the third analytics request message includes the analytics ID; and the fifth receiving subdevice is used for receiving the data analytics result corresponding to the analytics ID transmitted by the second NWDAF network function.

The data analytics apparatus provided in the embodiments of the present application can implement all the methods provided by the above-mentioned embodiments which takes the consumer network function as the execution entity and achieve the same effect. The same parts and beneficial effects as the method embodiments are not repeated herein.

It should be noted that, the division of units/modules in the embodiments of the present application is schematic, and is only a logical function division, and there can be other division manners in actual implementation. In an embodiment, the functional units in the various embodiments of the present application can be integrated into one processing unit, or each unit can exist alone physically, or two or more units can be integrated into one unit. The aforementioned integrated unit can be implemented in the form of hardware or software functional unit.

In the case that the integrated unit is implemented in the form of a software functional unit and sold or used as an independent product, it can be stored in a computer readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

Figure 17:
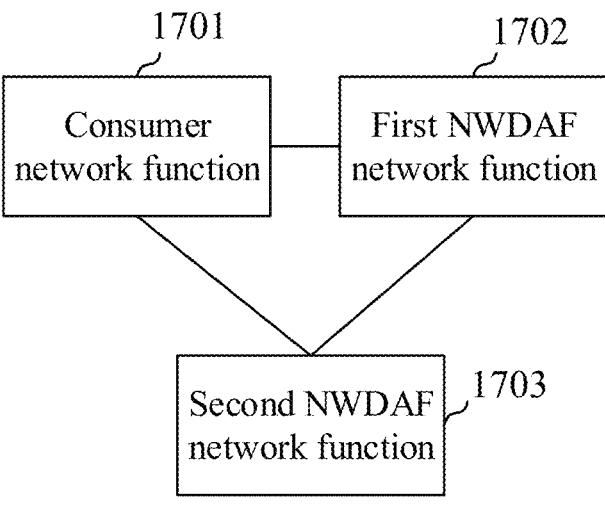
FIG. 17 is a schematic structural diagram of a system for data analytics according to an embodiment of the present application.

FIG. 17 is a schematic structural diagram of a system for data analytics according to an embodiment of the present application. As shown in FIG. 17, an embodiment of the present application provides a system for data analytics, including a consumer network function 1701, a first network data analytics function (NWDAF) network function 1702 and a second NWDAF network function 1703, where:

the consumer network function 1701 is used for transmitting a first analytics request message to the first NWDAF network function, where the first analytics request message includes an analytics identifier (ID);

the first NWDAF network function 1702 is used for determining, based on the first analytics request message, that the first NWDAF network function or other NWDAF network function provides the consumer network function with a data analytics result corresponding to the analytics ID; and the second NWDAF network function 1703 is used for providing the data analytics result corresponding to the analytics ID to the consumer network function in case that it is determined by the first NWDAF network function that the other NWDAF network function provides the consumer network function with the data analytics result corresponding to the analytics ID.

In an embodiment, an embodiment of the present application provides a processor-readable storage medium storing a computer program that causes, when executed by a processor, the processor to perform any one of the above methods, the method including:

receiving a first analytics request message transmitted by a consumer network function, where the first analytics request message includes an analytics identifier (ID); and determining, based on the first analytics request message, that the first NWDAF network function or other NWDAF network function provides the consumer network function with a data analytics result corresponding to the analytics ID.

In an embodiment, the method includes:

receiving an analytics request message, where the analytics request message includes an analytics identifier (ID), and the analytics request message is transmitted by a first NWDAF network function or a consumer network function in case that the first NWDAF network function is not able to provide a data analytics service to the consumer network function in case of not receiving area of interest (AOI) information; and providing, based on the analytics request message, a data analytics result corresponding to the analytics ID to the consumer network function.

In an embodiment, the method includes:

transmitting a first analytics request message to a first network data analytics function (NWDAF) network function, where the first analytics request message includes an analytics identifier (ID); and receiving a data analytics result corresponding to the analytics ID transmitted by the first NWDAF network function or a second NWDAF network function, where the second NWDAF network function is determined in case that it is determined that the first NWDAF network function is not able to provide a data analytics service to the consumer network function in case of not receiving area of interest (AOI) information.

It should be noted that, the processor readable storage medium can be any available medium or data storage device that can be accessed by the processor, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

It also should be noted that, the term "and/or" in the embodiments of the present application describes three situations of the related objects. For example, A and/or B can represent three situations: only A, A and B together, and only B. The character "/" generally represents that the two objects on two sides have a relationship of "or".

The term "multiple" in the embodiments of the present application refers to two or more, and other quantifiers are similar to it.

The solutions according to the embodiments of the present application can be applicable to various systems, for example, 5G systems. For example, the applicable systems can be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal and a network device, and can further include a core network part, such as an evolved packet system (EPS), a 5G system (5GS), and the like.

The terminal device in the embodiments of the present application can be a device that provides voice and/or data connectivity to a user, a handheld device with a wireless connection function, or other processing devices connected to a wireless modem. In different systems, the names of the terminal may be different. For example, in the 5G system, the terminal may be called as a user equipment (UE). A wireless terminal device can communicate with one or more core networks (CNs) via a radio access network (RAN), and the wireless terminal can be a mobile terminal device, such as a mobile phone (or cellular phone) and a computer with mobile terminal device, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session-initiated protocol (SIP) phone, a wireless local loop (WLL) station, a personal digital assistant (PDA) and other devices. A wireless terminal device may also be called a system, a subscriber unit, a subscriber station, a mobile station, a mobile platform, a remote station, an access point, a remote terminal, an access terminal, a user terminal, a user agent, or a user device, which is not limited in the embodiments of the present application.

The network device in the embodiments of the present application can be a network side device, and the network side device can include multiple cells providing services for the terminal. Depending on the specific scenario, the network side device may be called an access point, or a device communicating with a wireless terminal device through one or more sectors on the air interface in the access network, or other names. The network device can be used for exchanging received air frames with internet protocol (IP) packets, and acting as a router between the wireless terminal device and the rest of the access network, where the rest of the access network can include an IP communication network. The network device can also coordinate attribute management for the air interface. For example, the network device in the embodiments of the present application may be a base transceiver station (BTS) in a global system for mobile communications (GSM) or a code division multiple access (CDMA), or may be a node B in a wide-band code division multiple access (WCDMA), or may be an evolutional node B (eNB or e-Node B) in a long term evolution (LTE) system, or may be a 5G gNB in 5G network architecture (next generation system), or may be a home evolved node B (HeNB), a relay node, a femto, or a pico, etc., which is not limited in the embodiments of the present application. In some network structures, the network device may include a centralized unit (CU) node and a distributed unit (DU) node, and the centralized unit and the distributed unit may be geographically separated.

A multi-input multi-output (MIMO) transmission may be performed between the network device and the terminal device by using one or more antennas. The MIMO transmission may be single-user MIMO (SU-MIMO) or multi-user MIMO (MU-MIMO). Depending on the form and number of antenna combinations, MIMO transmission can be 2D-MIMO, 3D-MIMO, FD-MIMO or massive-MIMO, and may also be diversity transmission, precoding transmission, beamforming transmission, etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by processor-executable instructions. These processor-executable instructions may be provided to processors of a general-purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may be stored in processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

Various modifications and variations can be made in the present application without departing from the scope of the present application. Thus, provided that these modifications and variations of the present application are within the scope of the claims of the present application and their equivalents, the present application is also intended to cover such modifications and variations.

What is claimed is:

1. A method for data analytics, applied to a first network data analytics function (NWDAF) network function, comprising:

receiving a first analytics request message transmitted by a consumer network function, wherein the first analytics request message comprises an analytics identifier (ID); and determining, based on the first analytics request message, that other NWDAF network function provides the consumer network function with a data analytics result corresponding to the analytics ID, wherein the determining, based on the first analytics request message, that other NWDAF network function provides the consumer network function with the data analytics result corresponding to the analytics ID comprises:

in case that the first analytics request message does not comprise area of interest (AOI) information, determining whether the first NWDAF network function is able to provide a data analytics service to the consumer network function based on the analytics ID; and if the first NWDAF network function is not able to provide data analytics service to the consumer network function, determining that other NWDAF network function provides the consumer network function with the data analytics result corresponding to the analytics ID.

2. The method of claim 1, wherein the determining, based on the analytics ID, whether the first NWDAF network function is able to provide the data analytics service to the consumer network function comprises:

obtaining the UE location in case that a user equipment (UE) location is required for data analytics corresponding to the analytics ID; and if the UE location is not within the serving area of the first NWDAF network function, determining that the first NWDAF network function is not able to provide the data analytics service to the consumer network function.

3. The method of claim 1, wherein the determining, based on the first analytics request message, that other NWDAF network function provides the consumer network function with the data analytics result corresponding to the analytics ID comprises:

in case that it is determined, based on the first analytics request message, that the first NWDAF network function is not able to provide the data analytics service to the consumer network function, determining the other NWDAF network function, wherein the other NWDAF network function is used for providing the consumer network function with the data analytics result corresponding to the analytics ID.

4. The method of claim 3, wherein determining that the first NWDAF network function is not able to provide the data analytics service to the consumer network function comprises:

obtaining a UE location based on data analytics corresponding to the analytics ID; and if the UE location is not within a serving area of the first NWDAF network function, determining that the first NWDAF network function is not able to provide the data analytics service to the consumer network function.

5. The method of claim 2, wherein the obtaining the UE location comprises:

obtaining the UE location from an access and mobility management function (AMF) network function serving the UE.

6. The method of claim 1, wherein the determining, based on the analytics ID, whether the first NWDAF network function is able to provide the data analytics service to the consumer network function comprises:

determining a network function (NF) providing metadata based on the analytics ID;

obtaining a serving area of the NF; and if the serving area of the NF is not within the serving area of the first NWDAF network function, determining that the first NWDAF network function is not able to provide the data analytics service to the consumer network function.

7. The method of claim 6, wherein determining the serving area of the NF providing metadata comprises:

determining a network function ID of the NF providing metadata based on the analytics ID; and querying, based on the network function ID of the NF, the serving area of the NF corresponding to the network function ID of the NF from a network repository function (NRF) network function; or querying the serving area of the NF from the NF corresponding to the network function ID of the NF.

8. The method of claim 2, wherein after the determining that other NWDAF network function provides the consumer network function with the data analytics result corresponding to the analytics ID, further comprising:

transmitting an Nnrf_NFDiscovery_Request message to the NRF network function, wherein the Nnrf_NFDiscovery_Request message comprises the UE location or serving area information of the NF providing metadata; and receiving a candidate NWDAF network function list transmitted by the NRF network function, wherein the candidate NWDAF network function list is determined by the NRF network function based on the UE location or the serving area information of the NF providing metadata, and the candidate NWDAF network function list comprises a second NWDAF network function being able to provide the consumer network function with the data analytics result corresponding to the analytics ID, wherein the method further comprising:

transmitting the candidate NWDAF network function list to the consumer network function, or transmitting the second NWDAF network function determined based on the candidate NWDAF network function list to the consumer network function;

or, selecting a candidate NWDAF network function, from the candidate NWDAF network function list, as the second NWDAF network function; and transmitting a second analytics request message to the second NWDAF network function, wherein the second analytics request message comprises an ID of the consumer network function and the analytics ID.

9. A first network data analytics function (NWDAF) network function, comprising: a memory, a transceiver and a processor, wherein the memory is used for storing computer programs; the transceiver is used for transmitting and receiving data under a control of the processor; and the processor is used for reading the computer program in the memory and executing the method of claim 1.

10. A method for data analytics, applied to a second network data analytics function (NWDAF) network function, comprising:

receiving an analytics request message, wherein the analytics request message comprises an analytics identifier (ID) but not an area of interest (AOI) information, and the analytics request message is transmitted by a first NWDAF network function or a consumer network function in case that the first NWDAF network function is not able to provide a data analytics service to the consumer network function in case of not receiving AOI information; and providing, based on the analytics request message, a data analytics result corresponding to the analytics ID to the consumer network function, wherein the analytics request message, is received based on a determination that the second NWDAF network function provides the consumer network function with the data analytics result corresponding to the analytics ID, wherein the determination comprises:

in case that a first analytics request message does not comprise area of AOI information, determining whether the first NWDAF network function is able to provide a data analytics service to the consumer network function based on the analytics ID; and if the first NWDAF network function is not able to provide data analytics service to the consumer network function, determining that the second NWDAF network function provides the consumer network function with the data analytics result corresponding to the analytics ID.

11. The method of claim 10, wherein in case that the analytics request message is transmitted by the first NWDAF network function, the analytics request message comprises an ID of the consumer network function, the method further comprises:

transmitting an analytics response message to the consumer network function corresponding to the ID of the consumer network function, wherein the analytics response message is used to characterize that a second NWDAF network function provides the data analytics service to the consumer network function; and the providing, based on the analytics request message, the data analytics result corresponding to the analytics ID to the consumer network function comprises:

performing data analytics based on the analytics ID comprised in the analytics request message and providing the consumer network function corresponding to the ID of the consumer network function with the data analytics result.

12. The method of claim 10, wherein the analytics request message further comprises a UE location or serving area information of an NF providing metadata, the providing, based on the analytics request message, the data analytics result corresponding to the analytics ID to the consumer network function comprises:

performing data analytics based on the UE location or the serving area information of the NF providing metadata comprised in the analytics request message and providing the data analytics result corresponding to the analytics ID to the consumer network function.

13. A second network data analytics function (NWDAF) network function, comprising: a memory, a transceiver and a processor, wherein the memory is used for storing computer programs; the transceiver is used for transmitting and receiving data under a control of the processor; and the processor is used for reading the computer program in the memory and executing the method of claim 10.

14. A method for data analytics, applied to a consumer network function, comprising:

transmitting a first analytics request message to a first network data analytics function (NWDAF) network function, wherein the first analytics request message comprises an analytics identifier (ID) but not an area of interest (AOI) information; and receiving a data analytics result corresponding to the analytics ID transmitted by a second NWDAF network function, in a case of not receiving the AOI information wherein the second NWDAF network function is determined in case that it is determined that the first NWDAF network function is not able to provide a data analytics service to the consumer network function in case of not receiving AOI information, wherein the determining, based on a determination that the second NWDAF network function provides the consumer network function with the data analytics result corresponding to the analytics ID, wherein the determination comprises:

in case that the first analytics request message does not comprise area of AOI information, determining whether the first NWDAF network function is able to provide a data analytics service to the consumer network function based on the analytics ID; and if the first NWDAF network function is not able to provide data analytics service to the consumer network function, determining that the second NWDAF network function provides the consumer network function with the data analytics result corresponding to the analytics ID.

15. The method of claim 14, wherein the receiving the data analytics result corresponding to the analytics ID transmitted by the second NWDAF network function comprises:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

16. The method of claim 14, wherein the receiving the data analytics result corresponding to the analytics ID transmitted by the second NWDAF network function comprises:

receiving a candidate NWDAF network function list transmitted by the first NWDAF network function, wherein the candidate NWDAF network function list comprises ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, wherein the third analytics request message comprises the analytics ID; and receiving the data analytics result corresponding to the analytics ID transmitted by the second NWDAF network function.

17. A consumer network function, comprising: a memory, a transceiver and a processor, wherein the memory is used for storing computer programs; the transceiver is used for transmitting and receiving data under a control of the processor; and the processor is used for reading the computer program in the memory and executing the method of claim 14.

18. The consumer network function of claim 17, wherein the receiving the data analytics result corresponding to the analytics ID transmitted by the second NWDAF network function comprises:

receiving an ID of the second NWDAF network function transmitted by the first NWDAF network function; and determining the second NWDAF network function based on the ID of the second NWDAF network function, and receiving the data analytics result corresponding to the analytics ID transmitted by the second NWDAF network function.

19. The consumer network function of claim 17, wherein the receiving the data analytics result corresponding to the analytics ID transmitted by the second NWDAF network function comprises:

receiving a candidate NWDAF network function list transmitted by the first NWDAF network function, wherein the candidate NWDAF network function list comprises ID of at least one candidate NWDAF network function;

selecting a target NWDAF network function from the candidate NWDAF network function list, and taking the target NWDAF network function as the second NWDAF network function;

transmitting a third analytics request message to the second NWDAF network function based on an ID of the second NWDAF network function, wherein the third analytics request message comprises the analytics ID; and receiving the data analytics result corresponding to the analytics ID transmitted by the second NWDAF network function.

* * * * *